US012711116B2

(12) United States Patent
Wouhaybi et al.

(10) Patent No.: US 12,711,116 B2
(45) Date of Patent: Aug. 18, 2026

(54) STORAGE AND ANALYSIS OF TIME-SERIES DATA BASED ON DATA CONTEXT AND PATTERNS

(71) Applicant: SK Hynix NAND Product Solutions Corp., Rancho Cordova, CA (US)

(72) Inventors: Rita H. Wouhaybi, Portland, OR (US); Samudyatha Kaira, Portland, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/909,819

(22) Filed: Oct. 8, 2024

(65) Prior Publication Data

US 2026/0099478 A1 Apr. 9, 2026

(51) Int. Cl.
*G06F 16/22* (2019.01)
*G06F 16/2458* (2019.01)

(52) U.S. Cl.
CPC ...... *G06F 16/2228* (2019.01); *G06F 16/2477* (2019.01)

(58) Field of Classification Search
CPC .................................................. G06F 16/2228
USPC ........................................................ 707/746
See application file for complete search history.

(56) References Cited

U.S. PATENT DOCUMENTS

2012/0078416 A1* 3/2012 Iba ........................ B62D 57/032 901/1
2017/0052960 A1* 2/2017 Alizadeh-Shabdiz ........................ G06F 16/285
2021/0073204 A1* 3/2021 Liang .................. G06F 11/3409
2022/0035351 A1* 2/2022 Bauer .............. G05B 19/41875
2022/0087763 A1* 3/2022 Torabi ..................... A61B 34/75
2022/0245096 A1* 8/2022 Ferranti .............. H03M 7/3059
2025/0130563 A1* 4/2025 Minagawa ........... G05B 23/024

* cited by examiner

*Primary Examiner* — Baoquoc N To
(74) *Attorney, Agent, or Firm* — Morgan, Lewis & Bockius LLP

(57) ABSTRACT

A method is implemented to compress, analyze, or store time-series data at a computer system having one or more processors and memory. The computer system obtains from an electronic device a plurality of time-series data sets, and each time-series data set includes a temporally indexed sequence of data items. The computer system identifies a first data pattern that is shared by the plurality of time-series data sets, the first data pattern including a first subset of successive data items, and represents the first data pattern with a first pattern indicator. The first pattern indicator is applied in place of the first subset of successive data values corresponding to the first data pattern in each of the plurality of time-series data sets. The computer system stores the first data pattern and the plurality of time-series data sets each of which includes the first pattern indicator.

20 Claims, 9 Drawing Sheets

100
102
132
128
134
180
106
122
130
124
110
Work Data
160
NETWORK(S)
150
116
Storage
118
140
108
HVAC
104
68°F
112
126
114
136
WiFi
120

STORAGE AND ANALYSIS OF TIME-SERIES DATA BASED ON DATA CONTEXT AND PATTERNS

TECHNICAL FIELD

This application relates generally to data management technology, and more particularly to methods, systems, devices, and non-transitory computer-readable storage media for managing (e.g., compressing, analyzing, or storing) time-series data collected in a cloud-based computer system.

BACKGROUND

Large amounts of data are collected at edge devices and may need to be processed and stored on a cloud-based work environment. The data is oftentimes transmitted to centralized storage systems for storage and analysis. If this data is not compressed or only compressed using data sampling techniques, several issues can arise. Without compression, the volume of raw data can overwhelm network bandwidth, leading to transmission delays and increased latency, particularly in bandwidth-constrained environments. This can strain real-time applications that rely on timely data processing. In some situations, data are compressed for storage based on a sampling frequency, which may reduce storage needs but at the cost of data granularity and accuracy. Sampling may miss critical information, especially in high-frequency or detailed sensor applications, where every data point matters for precise analytics. Both scenarios—no compression or sampling-based compression—can limit scalability, increase operational costs, and compromise the quality of insights derived from the data. These limitations emphasize the need for efficient and low-loss compression techniques in computing of edge-collected data to balance storage efficiency and data fidelity.

SUMMARY

Accordingly, there is a need for a data processing or compression solution that efficiently reduces the size of large data sets collected by edge devices (e.g., smart devices, client devices) with minimal or no loss of information. Various embodiments of this application are directed to methods, systems, devices, non-transitory computer-readable media for processing (e.g., compressing and decompressing) time-series data based on data context or data patterns. Assume that the time-series data are created by a physical process, and therefore, follow embedded data patterns associated with the physical process. In some situations, an embedded data pattern may be difficult for a human to discern, while artificial intelligence may be applied to identify the embedded data pattern in a single set of time-series data or in multiple time-series data sets. A set of time-series data may include one or more data segments corresponding to different data patterns, and pattern indicators may be applied to represent the one or more data segments in the set of time-series data. By these means, large amounts of time-series data may be compressed and stored in an automatic, scalable, adaptive, and data-centric manner with minimal or no data loss, particularly facilitating edge applications (e.g., application executed at a sensor device, a storage device, or a client device) to implement mission critical tasks.

In some embodiments, edge devices are physical hardware that serve as gateways between the real world and a network communicatively coupled to a centralized cloud or data center. For example, an edge device may be one of a client device, a smart device (e.g., a sensor device, an actuator device), and a storage device (e.g., solid-state drives (SSDs)).

In one aspect, a method for compressing data is implemented at a computer system having one or more processors and memory. The method includes obtaining, from an electronic device (e.g., a sensor device), a plurality of time-series data sets, and each time-series data set includes a temporally indexed sequence of data items. The method further includes identifying a first data pattern that is shared by the plurality of time-series data sets, and the first data pattern includes a first subset of successive data items. The method further includes representing the first data pattern with a first pattern indicator, applying the first pattern indicator in place of the first subset of successive data values corresponding to the first data pattern in each of the plurality of time-series data sets, and storing the first data pattern and the plurality of time-series data sets each of which includes the first pattern indicator.

In another aspect, some implementations include a computer system that includes one or more processors and memory having instructions stored thereon for performing any of the above methods of compressing data.

In yet another aspect, some implementations include a non-transitory computer readable storage medium storing one or more programs. The one or more programs include instructions, which when executed by one or more processors of a computer system cause the one or more processors to implement any of the above methods of compressing data.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Time-series data are generated and used in a plethora of applications that range from healthcare, manufacturing, aerospace, and others. Time-series data may contain numerical data items. For example, a time-series data set includes a plurality of timestamps each of which is paired with a respective numerical value (e.g., measured by a temperature sensor during a physical process). In some situations, the time-series data set recorded by a sensor keeps growing in size and can reach a data size of zettabyte in a limited duration of time (e.g., one day). Additionally, in some embodiments, the time-series data associated with a user application include one or more distinct data patterns, which may repeatedly occur at different temporal location (e.g., corresponding to a phase) in the same time-series data or among different time-series data sets. In an example, a data pattern may correspond to a feature event.

Various embodiments of this application are directed to methods, systems, devices, non-transitory computer-readable media for processing (e.g., compressing and decompressing) time-series data based on data context or data patterns. In some embodiments, a time-series data set includes a temporal sequence of successive data items having a plurality of data segments. Each of the plurality of data segments further includes a respective subset of successive data items that are substantially constant (e.g., have a variation within a small variation tolerance), allowing the respective data segment to be processed to reduce data redundancy and create context to make the data segment highly usable. In some example healthcare applications, electrocardiogram (ECG or EKG) machines and other medical sensors create large amounts of medical data associated with medical events based on human activities. Depending on the context of the medical events, redundant data may be compressed accordingly to save storage space, computational resources, and data communication bandwidths. More specifically, in some embodiments, the time-series data are compressed based on data patterns, data context, and/or data relationship, thereby conserving the storage space, computational resources, and data communication bandwidths.

Figure 4:
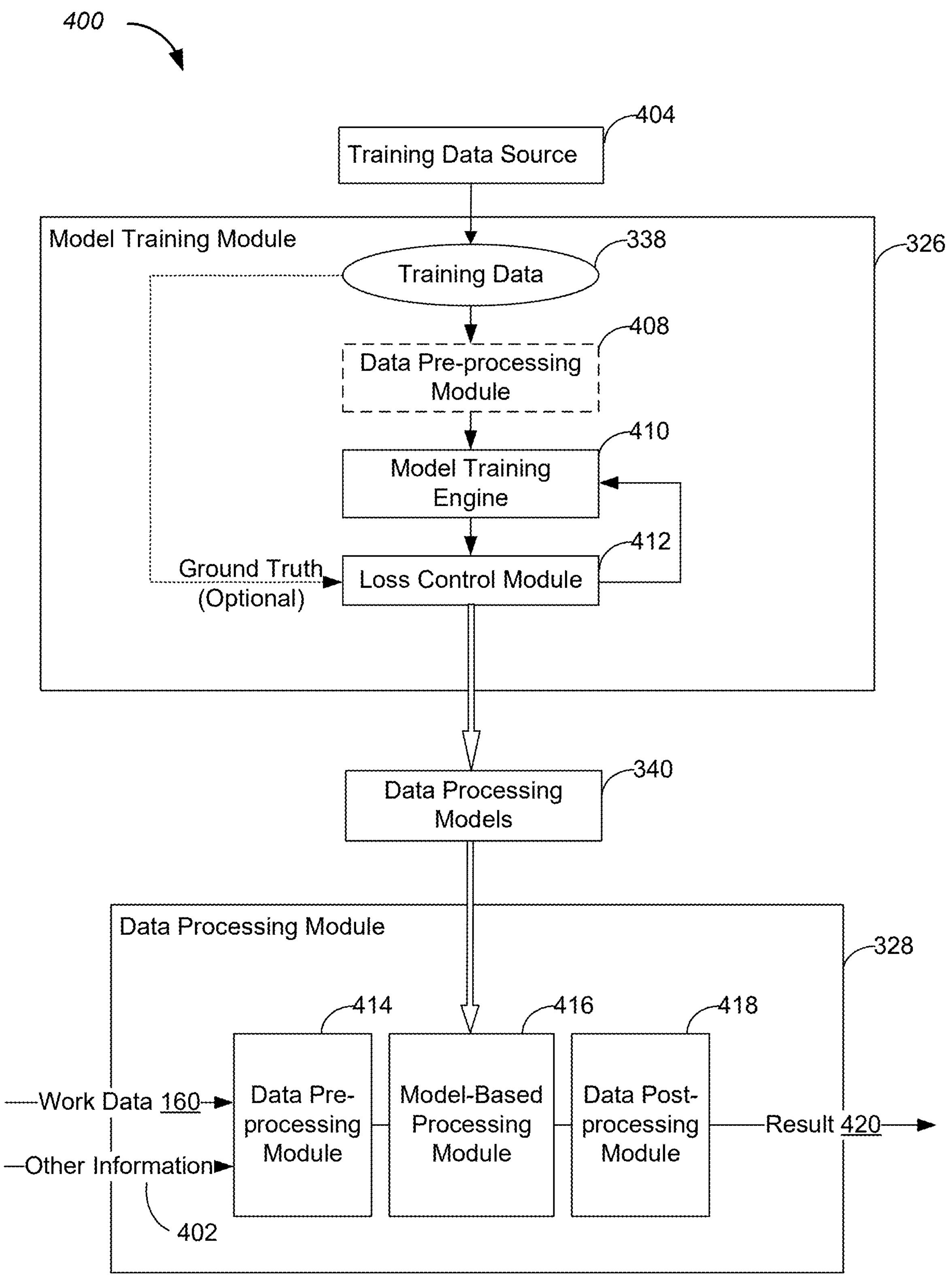
FIG. 4 is a block diagram of a machine learning system for training and applying data processing models using machine learning, in accordance with some embodiments.
Figure 5A:
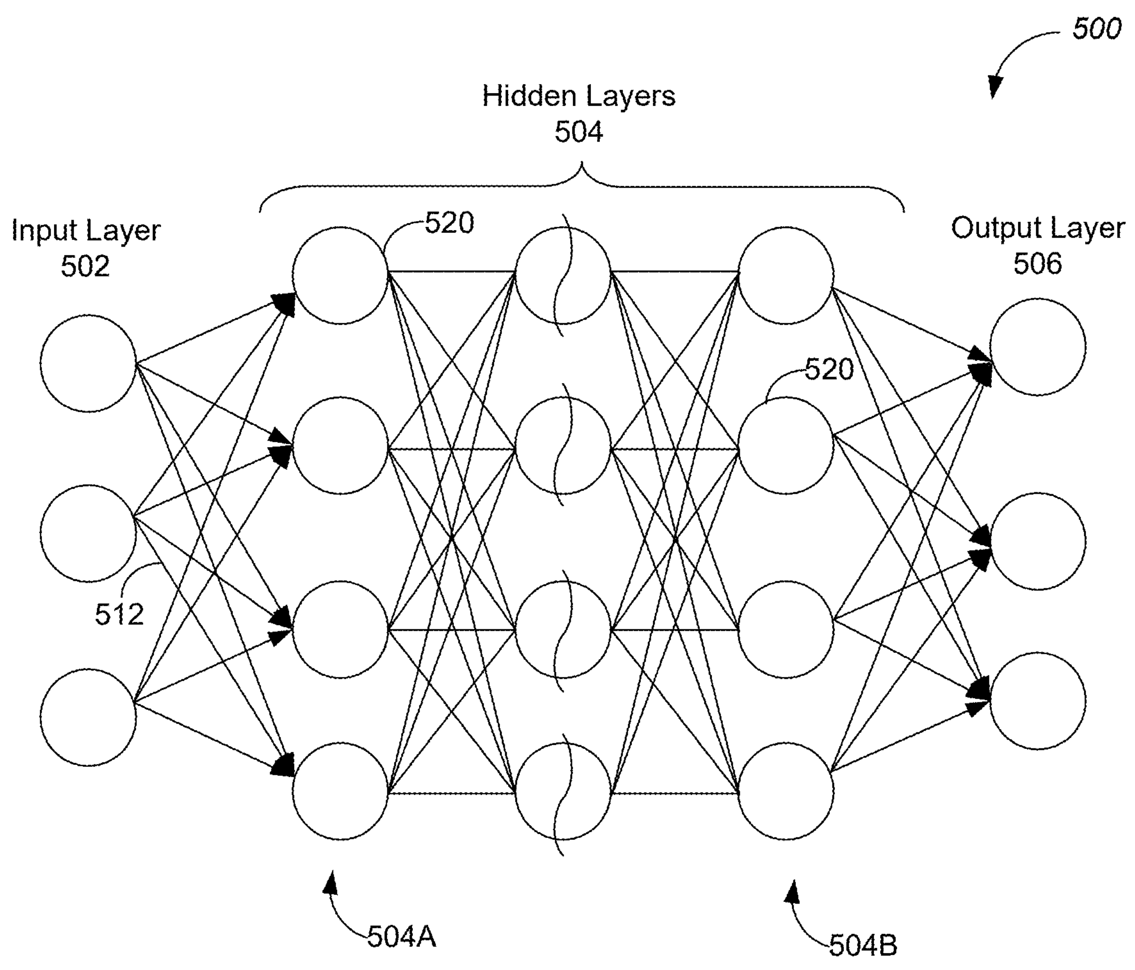
FIG. 5A is a structural diagram of an example neural network applied to process work data in a data processing model, in accordance with some embodiments.
Figure 5B:
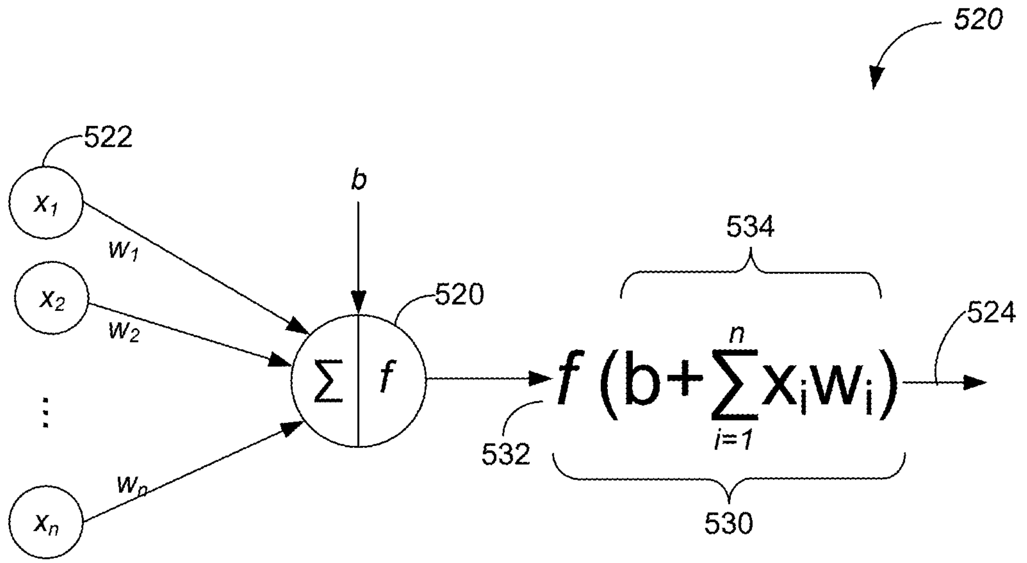
FIG. 5B is an example node in the neural network, in accordance with some embodiments.
Figure 6:
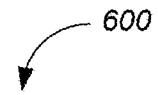
FIG. 6 is a plot of example correlation curves between a voltage and a current measured in spot welding operations, in accordance with some embodiments.
Figure 6:
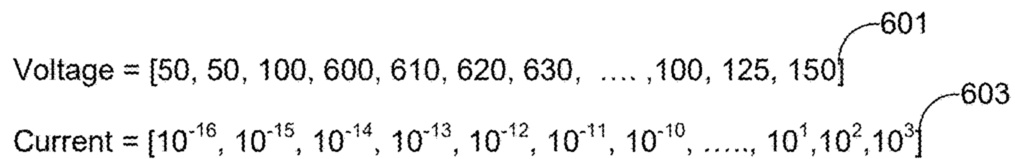
Figure 6:
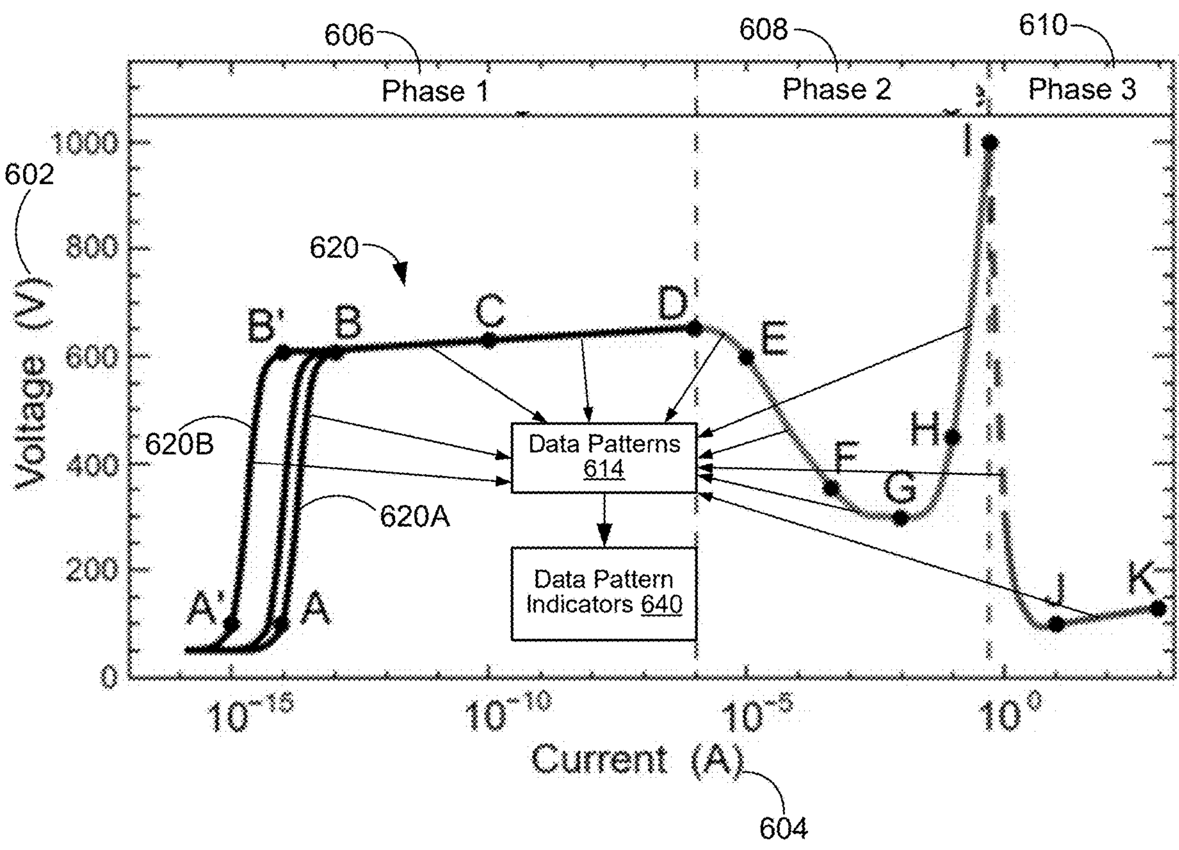
Figure 6:
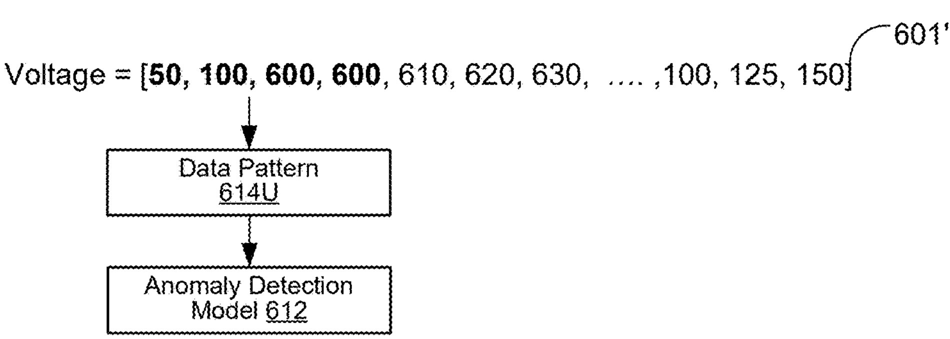

FIGS. 1-5B provide background exemplary electronic device networks and capabilities (e.g., machine learning based data processing capabilities) described herein, which are helpful in understanding the details of the embodiments described from FIG. 6 onward.

FIGS. 1-5B provide background exemplary sensor device networks and capabilities (e.g., machine learning based data processing capabilities) described herein, which are helpful in understanding the details of the embodiments described from FIG. 6 onward.

Figure 1:
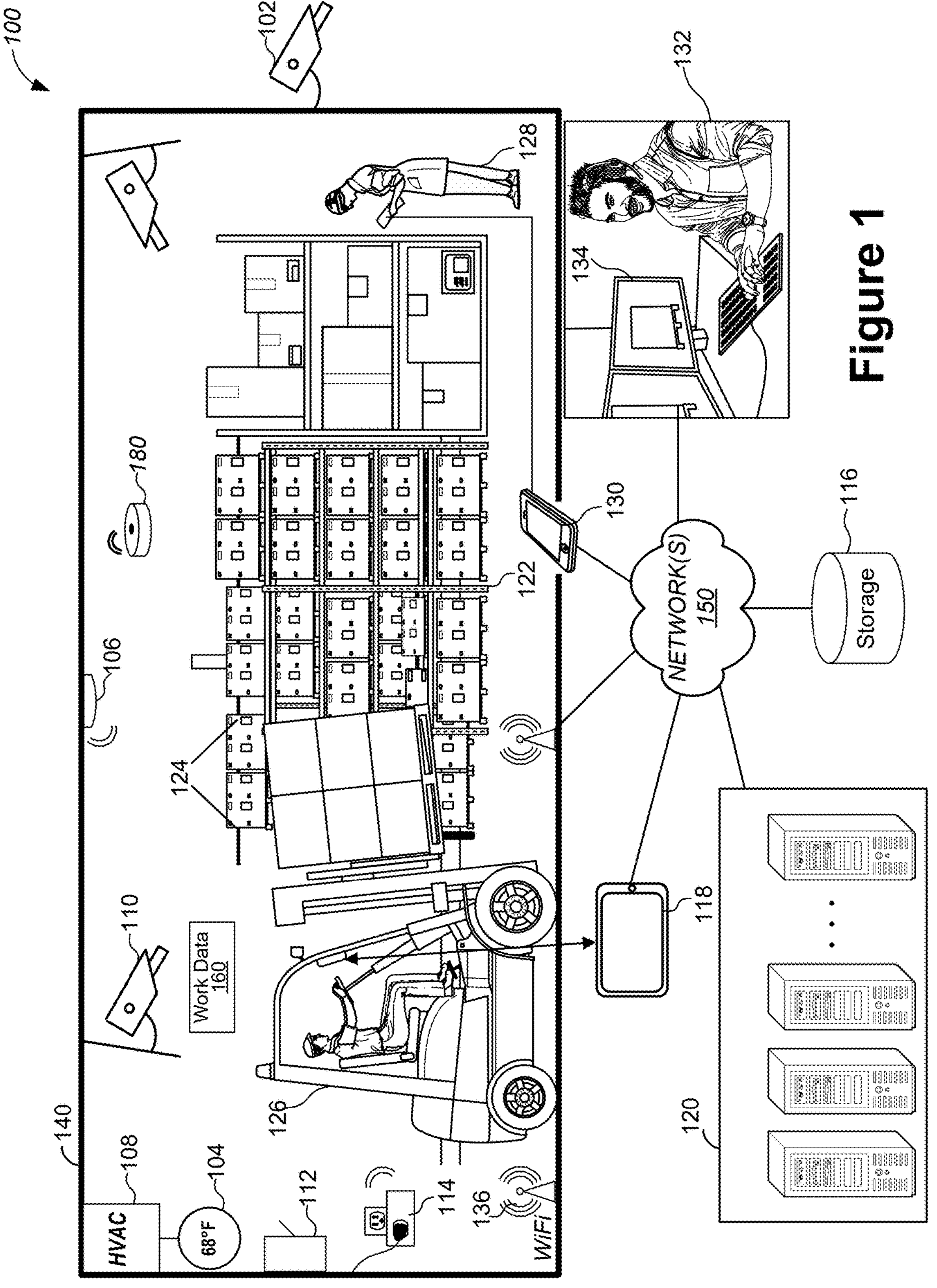
FIG. 1 depicts a representative smart work environment, in accordance with some implementations.

FIG. 1 depicts a representative smart work environment 100 in accordance with some implementations. The smart work environment 100 includes a structure 140, which may be used as a warehouse, factory, construction site, farm, laboratory, office space, retail store, hospital, and the like. For example, the structure 140 may be used as a distribution center, an e-commerce fulfillment center, an automobile assembly plant, an electronics manufacturing facility, a supermarket, or a retailer store. It will be appreciated that the structure 140 has an open floor plan, high ceilings, and support structures (e.g. columns or beams) and may include different functional areas designed for efficiency, safety, and scalability. Further, the smart work environment 100 may control and/or be coupled to devices outside of the actual structure 140. Indeed, several devices in the smart work environment 100 need not be physically within the structure 140. For example, a surveillance camera 102 may be located outside of the structure 140.

The depicted structure 140 may include a plurality of areas (e.g., storage areas, work areas) that may not be physically separated by walls. The depicted structure 140 may also include rooms (not shown) that are separated from the plurality of areas by walls. Devices may be mounted on, integrated with, and/or supported by a wall, a floor, a ceiling, or a support structure of the structure 140. Alternatively, devices may be mounted on, integrated with, and/or supported by an object (e.g., a shelf 122, a forklift 126) fixed or moveable in the structure 140.

In some implementations, the smart work environment 100 includes a plurality of devices, including intelligent, multi-sensing, network-connected devices, that integrate seamlessly with each other in a network 150 and/or with a central server system 120 or a cloud-computing system to provide a variety of useful smart work functions. The smart work environment 100 may include one or more surveillance cameras 102, one or more intelligent, multi-sensing, network-connected thermostats 104 ("smart thermostats") and one or more intelligent, network-connected, multi-sensing hazard detection units 106 ("smart hazard detectors"). In some implementations, the smart thermostat 104 detects ambient climate characteristics (e.g., temperature and/or humidity) and controls an HVAC system 108 accordingly. The smart hazard detector 106 may detect the presence of a hazardous substance or a substance indicative of a hazardous substance (e.g., smoke, fire, and/or carbon monoxide). The surveillance cameras 102 may detect a person's or a vehicle's approach to or departure from the structure 140, identify and/or report any abnormal incidents, and/or control settings on a security system (e.g., to activate or deactivate the security system).

In some implementations, the smart work environment 100 includes one or more intelligent, multi-sensing, network-connected wall switches 112 ("smart wall switches"), along with one or more intelligent, multi-sensing, network-connected wall plug interfaces 114 ("smart wall plugs"). The smart wall switches 112 may detect ambient lighting conditions, detect room-occupancy states, and control a power and/or dim state of one or more lights. In some instances, smart wall switches 112 may also control a power state or speed of a fan, such as a ceiling fan. The smart wall plugs 114 may detect occupancy of a room or enclosure and control supply of power to one or more wall plugs (e.g., such that power is not supplied to the plug if nobody is present in the structure 140).

In some implementations, the smart work environment 100 includes a plurality of network-connected cameras 110 that are configured to provide video monitoring and security inside the structure 140. For example, the structure 140 is used as a warehouse, which is a bustling hub of activity, with neatly organized shelves 122 stretching high to accommodate an extensive inventory of product boxes 124. Each shelf 122 is carefully labeled and arranged to maximize space and ensure efficient access to goods. A forklift 126 may navigate the wide aisles with precision, lifting and moving boxes 124 from one location to another with a steady hum of its engine. The forklift 126 may include a computer device 118 for obtaining and updating information of the boxes 124 (e.g., box locations, weights, handling details). A worker 128 may check the stock levels on a handheld device 130, verifying the quantities and ensuring that inventory records match the physical stock. The air is filled with the sounds of the forklift's beeping and the occasional rustle of boxes as the warehouse maintains a routine of receiving, storing, and preparing products for distribution. A plurality of cameras 110 are distributed at different locations in the structure 140, and configured to capture static images or video clips monitoring activities of the forklift 126 and the worker 128.

The devices 102-114 (e.g., collectively called smart devices 280 in FIG. 2) are examples of sensors and actuators that are disposed in the smart work environment 100 for collecting work data 160 (e.g., image data captured by cameras 110, temperature data captured by the smart thermostat 104). In some embodiments now shown, a variety of smart devices 280 are used to optimize efficiency and ensure smooth operations in the smart work environment 100. For example, radio frequency identification (RFID) sensors are employed to track products throughout the structure 140, ensuring that items are accurately located and inventoried. Proximity sensors may help robots and autonomous vehicles navigate safely by detecting obstacles and other machines. Infrared and optical sensors are used for barcode scanning, enabling quick identification of products. Additionally, pressure and weight sensors ensure that items are handled carefully and that shipping weights are accurate. Additional environmental sensors monitor conditions such as humidity to protect sensitive products. These technologies work together to create a highly automated and efficient smart work environment 100.

By virtue of network connectivity, one or more of the smart devices 280 may further allow a user to interact with the devices even if a user 132 is not proximate to the devices For example, the user 132 may communicate with a device using a computer device 134 (e.g., a desktop computer, laptop computer, a tablet computer, or other portable electronic device (e.g., a smartphone)). A webpage or application may be configured to receive communications from the user 132 and control the smart devices 280 based on the communications and/or to present information about the device's operation to the user 132. For example, the user 132 may view a current set point temperature for the smart thermostat 104 and adjust it using the computer device 134. The user 132 may review signature events captured by the camera 110 or adjust settings of the camera 110 using the computer device 134. The user 132 may be physically located within or outside the structure 140 during this remote communication.

As discussed above, users may control the smart thermostat 104 and other smart devices in the smart work environment 100 using a network-connected computer device 134. In some examples, a plurality of employees of a business entity associated with the structure 140 may register their devices 134 with the smart work environment 100. Such registration may be made at a central server 120 to authenticate the employees and/or the devices 134 as being associated with the structure 140 and to give permission to the employees to use the devices 134 to access the smart devices 280 in the structure 140. Employees may use their registered devices 134 to remotely control the smart devices 280 of the structure 140, e.g., when an employee is at work, on vacation, or at a separate office location. The employee may also use a registered device 134 (e.g., handheld device 130) to control the smart devices 280 when the employee is actually located inside the structure 140, such as when the employee is checking stocking in the warehouse.

In some implementations, in addition to containing processing and sensing capabilities, the devices 102, 104, 106, 108, 110, 112, and/or 114 ("the smart devices") are capable of data communications and information sharing with other smart devices, a central server or cloud-computing system, and/or other devices that are network-connected. The required data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any of a variety of custom or standard wired protocols (e.g., CAT6 Ethernet or HomePlug), or any other suitable communication protocol.

In some implementations, the smart devices 280 serve as wireless or wired repeaters. For example, a first one of the smart devices communicates with a second one of the smart devices via a wireless router. The smart devices may further communicate with each other via a connection to one or more networks 150 such as the Internet. Through the one or more networks 150, the smart devices may communicate with a smart work server system 120 (also called a central server system and/or a cloud-computing system herein). In some implementations, the smart work server system 120 may include multiple server systems, each dedicated to data processing associated with a respective subset of the smart devices (e.g., a video server system may be dedicated to data processing associated with camera(s) 110). The smart work server system 120 may be associated with a manufacturer, support entity, or service provider associated with the smart devices 280. In some implementations, the smart work environment 100 relies on a dedicated hub device 180 to manage smart devices 280 located within the smart work environment 100, and a hub device server system associated with the hub device 180 serves as the server system 120.

In some implementations, a user is able to contact customer support using a smart device itself rather than needing to use other communication means, such as a telephone or Internet-connected computer. In some implementations, software updates are automatically sent from the smart work server system 120 to smart devices 280 (e.g., when available, when purchased, or at routine intervals). In some embodiments, the smart work environment 100 further includes a storage 116 for storing data related to the servers 120, smart devices 280, client devices 118, 130, and 134 (e.g., collectively called client device 240 in FIG. 2), and applications executed on the client devices. In some embodiments, the storage 116 includes a plurality of SSDs.

Figure 2:
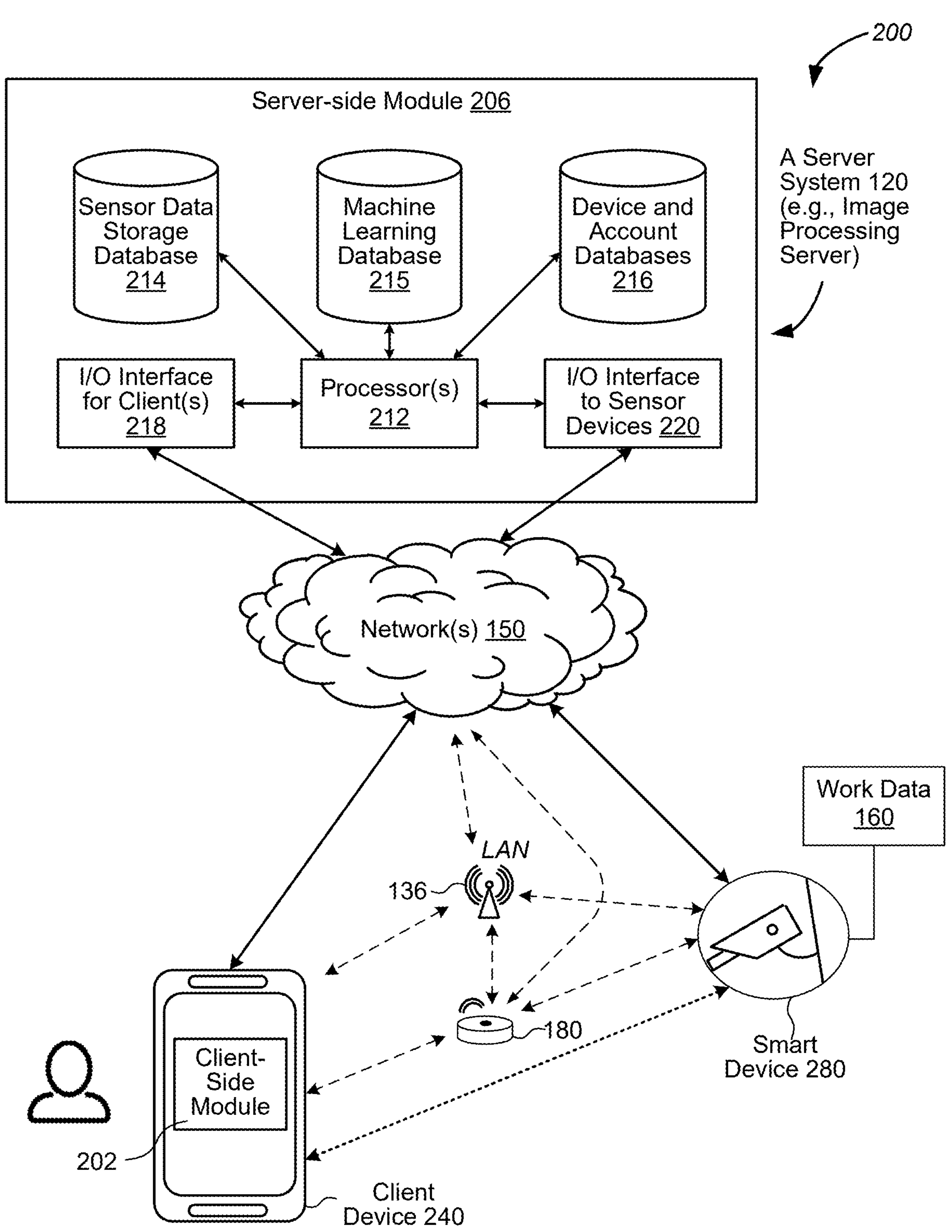
FIG. 2 is an example operating environment in which a smart device interacts with a client device or a server system, in accordance with some implementations.

FIG. 2 is an example operating environment 100 in which a smart device 280 (e.g., cameras 110) interacts with a client device 240 (e.g., devices 118, 130, and 134 in FIG. 1) or a server system 120 (e.g., an image processing server), in accordance with some implementations. In the operating environment 200, the server system 120 provides data processing for monitoring and facilitating review of object location/motion associated with imaging device data streams (e.g., raw or processed work data 160) captured by multiple cameras 110 disposed in the structure 140. As shown in FIG. 2, the server system 120 may receive raw or processed work data 160 from smart devices 280 (standalone or integrated) located at various physical locations in the smart work environments 100. Each smart device 280 may be bound to one or more reviewer accounts, and the server system 120 may further process the received work data 160 to obtain information associated with the smart device 280 and the corresponding reviewer accounts. For a camera 110, the obtained information could be object locations, object movements, user gestures, and depth mapping. In some implementations, the server system 120 provides the information to client devices 240 associated with the reviewer accounts. In some implementations, the server system 120 uses the information to control a smart device 280 linked to the reviewer accounts.

In some implementations, the server system 120 is a dedicated image processing server that provides data processing services to cameras 110 and client devices 240 independently of other services provided by the server system 120.

In some implementations, each of the smart devices 280 captures work data 160 using signal detectors and sends the captured work data 160 to the server system 120 substantially in real time. In some implementations, each of the smart devices 280 includes a controller device (e.g., a smart device in which a camera 110 is integrated) that serves as an intermediary between the smart device 280 and the server system 120. The controller device receives the work data 160 from the one or more smart devices 280, optionally performs some preliminary processing on the work data 160, and sends the processed work data 160 to the server system 120 on behalf of the one or more smart devices 280 substantially in real time. In some implementations, each smart device 280 has its own on-board processing capabilities to perform some preliminary processing on the captured work data 160 before sending the processed work data 160 (along with metadata obtained through the preliminary processing) to the controller device and/or the server system 120. In some implementations, the client device 240 located in the smart work environment 100 functions as the controller device to at least partially process the captured work data 160.

In accordance with some implementations, each of the client devices 240 includes a client-side module 202. The client-side module 202 communicates with a server-side module 206 executed on the server system 120 through the one or more networks 150. The client-side module 202 provides client-side functionality for information monitoring, review processing, and communication with the server-side module 206. The server-side module 206 provides server-side functionality for event monitoring and review processing for any number of client-side modules 202, each residing on a respective client device 240. The server-side module 206 also provides server-side functionality for response processing and device control for any number of the smart devices 280.

In some implementations, the server-side module 206 includes one or more processors 212, a sensor data database 214, machine learning database 215, device and account databases 216, an I/O interface 218 to one or more client devices, and an I/O interface 220 to one or more smart devices 280. The I/O interface 218 to one or more clients facilitates the client-facing input and output processing for the server-side module 206. The device and account databases 216 store a plurality of profiles for reviewer accounts registered with the server system 120. A user profile includes account credentials for each reviewer account, and identifies one or more smart devices 280 linked to the reviewer account. In some implementations, the user profile of each reviewer account includes information related to capabilities, device characteristics, and lookup tables for the smart devices 280 linked to the reviewer account. The I/O interface 220 to one or more imaging devices facilitates communications with one or more smart devices 280 (standalone or integrated). The sensor data storage database 214 stores raw or processed work data 160 received from the smart devices 280 and associated information, as well as various types of metadata, such as device characteristics of signal emitters and detectors, lookup tables, modulation signals, and sampling rates. In some implementations, this data is used for generating additional information associated with each reviewer account. The machine learning database 215 stores data used by the server 120, the smart devices 280, or the client devices 240 to process the work data 160 collected by the smart devices 280 based on machine learning. For example, machine learning based data processing models and associated training data are stored in the machine learning database 215.

Client devices 240 include handheld computers, wearable computing devices, personal digital assistants (PDAs), tablet computers, laptop computers, desktop computers, cellular telephones, smart phones, enhanced general packet radio service (EGPRS) mobile phones, media players, navigation devices, game consoles, televisions, remote controls, point-of-sale (POS) terminals, vehicle-mounted computers, ebook readers, or a combination of any two or more of these data processing devices or other data processing devices.

Examples of the one or more networks 150 include local area networks (LANs) and wide area networks (WANs) such as the Internet. In some implementations, the one or more networks 150 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

In some implementations, the server system 120 is implemented on one or more standalone data processing devices or a distributed network of computers. In some implementations, the server system 120 employs various virtual devices and/or services of third party service providers (e.g., third-party cloud service providers) to provide the underlying computing resources and/or infrastructure resources of the server system 120. In some implementations, the server system 120 includes handheld computers, tablet computers, laptop computers, desktop computers, or a combination of any two or more of these data processing devices or other data processing devices.

The server-client environment 200 shown in FIG. 2 includes both a client-side portion (e.g., the client-side module 202) and a server-side portion (e.g., the server-side module 206). The division of functionality between the client and server portions of operating environment 200 can vary in different implementations. Similarly, the division of functionality between the smart devices 280 and the server system 120 can vary in different implementations. In some implementations, the client-side module 202 is a thin-client that provides only user-facing input and output processing functions, and delegates other data processing functionality to a backend server (e.g., the server system 120). In some implementations, a smart device 280 is a simple data capturing device that continuously captures and streams work data 160 to the server system 120, with limited local preliminary processing of the data. Although many aspects of the present technology are described from the perspective of a computer system (e.g., system 300) as a whole, the corresponding actions performed by the client device 240 and/or the server system 120 would be apparent to those of skill in the art. Some aspects of the present technology may be described from the perspective of the client device or the server system, and the corresponding actions performed by the server system would be apparent to those of skill in the art. Furthermore, some aspects of the present technology may be performed by the server system 120, the client device 240, and the smart device 280 cooperatively.

It should be understood that the operating environment 200 that involves the server system 120, the client device 240, and the smart device 240 is merely an example. Many aspects of operating environment 200 are generally applicable in other operating environments in which a server system provides data processing for monitoring and facilitating review of data captured by other types of electronic devices.

The smart devices, the client devices, and the server system communicate with each other using the one or more communication networks 150. In an example smart work environment 100, two or more devices (e.g., the network interface device 136, the hub device 180, the client devices 240, and the smart devices 204) are located in close proximity to each other, such that they can be communicatively coupled in the same sub-network via wired connections, a WLAN, or a Bluetooth Personal Area Network (PAN). The Bluetooth PAN is optionally established based on classical Bluetooth technology or Bluetooth Low Energy (BLE) technology. In some implementations, each of the hub device 180, the client device 240, and the smart devices 204 are communicatively coupled to the networks 150 via the network interface device 136.

Figure 3:
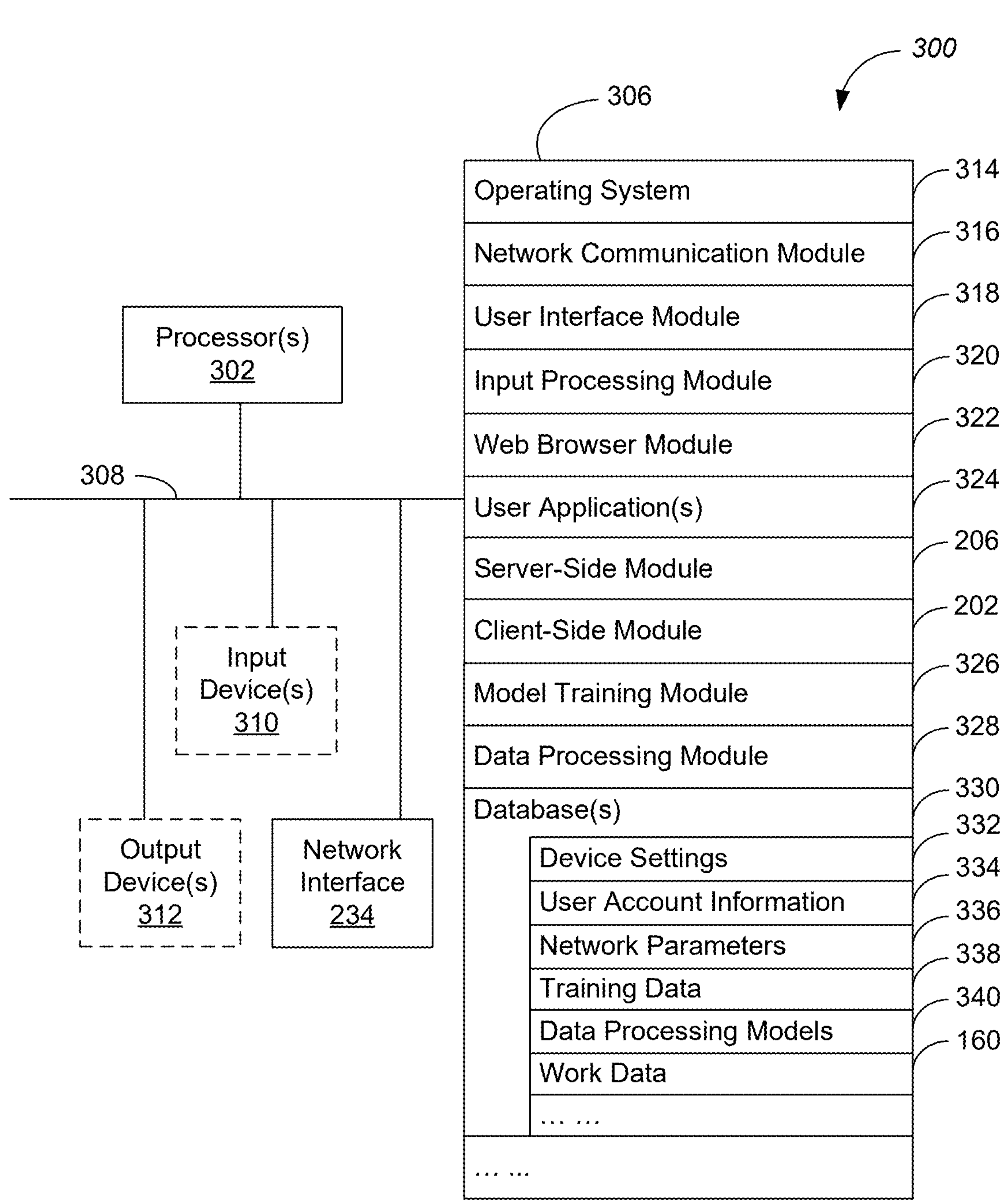
FIG. 3 is a block diagram illustrating a computer system of a smart work environment, in accordance with some implementations.

FIG. 3 is a block diagram illustrating a computer system 300 of a smart work environment 100 in accordance with some implementations. The computer system 300 includes a server 120, a client device 240 (e.g., computer device 118, 130, or 134 in FIG. 1), a smart device 280 (e.g., devices 102-114 in FIG. 1), a storage 116, or a combination thereof, and is configured to enable the smart work environment 100. The computer system 300 includes one or more processing units (CPUs) 302, one or more network interfaces 304, memory 306, and one or more communication buses 308 for interconnecting these components (sometimes called a chipset). In some implementations, the computer system 300 includes one or more input devices 310, which facilitate user input, such as a keyboard, a mouse, a voice-command input unit or microphone, a touch screen display, a touch-sensitive input pad, a gesture capturing camera, or other input buttons or controls. In some implementations, the computer system 300 uses a microphone and voice recognition or a camera and gesture recognition to supplement or replace the keyboard. In some implementations, the computer system 300 includes one or more cameras, scanners, or photo sensor units for capturing images. In some implementations, the computer system 300 includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some implementations, the memory 306 includes non-volatile memory, such as one or more magnetic disk storage devices, one or more optical disk storage devices, one or more flash memory devices, or one or more other non-volatile solid state storage devices. In some implementations, the memory 306 includes one or more storage devices remotely located from the processing units 302. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

- an operating system 314, which includes procedures for handling various basic system services and for performing hardware dependent tasks;
- a network communication module 316, which connects the computer system 300 to other devices (e.g., various servers in the server system 120, a client device, or a smart device) via one or more network interfaces 304 (wired or wireless) and one or more networks 150, such as the Internet, other wide area networks, local area networks, metropolitan area networks, and so on;
- a user interface module 318, which enables presentation of information (e.g., a graphical user interface for presenting applications, widgets, websites and web pages thereof, and/or games, audio and/or video content) at a client device 118, 130, and 134;
- an input processing module 320 for detecting one or more user inputs or interactions from one of the one or more input devices 310 and interpreting the detected input or interaction;
- a web browser module 322 for navigating, requesting (e.g., via HTTP), and displaying websites and web pages thereof, including a web interface for logging into a user account associated with a client device 140 or another electronic device, controlling the client or electronic device if associated with the user account, and editing and reviewing settings and data that are associated with the user account;
- one or more user applications 324 for execution by the servers 120 (e.g., smart work applications, and/or other web or non-web based applications);
- a server-side module 206, which communicates both with smart work environments 100 and with client-side modules 202 and includes a plurality of individual programs, procedures, modules, and/or objects for performing a variety of functions;
- a client-side module 202, which communicates with the server-side module 206 in the smart work environment 100 and includes a plurality of individual programs, procedures, modules, and/or objects for performing a variety of functions;

model training module 326 for receiving training data and establishing one or more data processing models 340 for processing work data 160 (e.g., video, image, audio, or textual data) collected by the smart devices 280;

a data processing module 328 for processing work data 160 using data processing models 340, thereby identifying information contained in the work data 160, matching the work data 160 with other data, categorizing the work data 160, or synthesizing related work data 160; and one or more databases 330 for storing at least data including one or more of:
  - device settings 332 including common device settings (e.g., service tier, device model, storage capacity, processing capabilities, communication capabilities, etc.) of the one or more servers 120, client devices, or smart devices;
  - user account information 334 for the one or more user applications 324, e.g., user names, security questions, account history data, user preferences, and predefined account settings;
  - network parameters 336 for the one or more communication networks 150, e.g., IP address, subnet mask, default gateway, DNS server and host name;
  - training data 338 for training one or more data processing models 340;
  - data processing model(s) 340 for processing work data 160 (e.g., video, image, audio, or textual data) using deep learning techniques;
  - work data 160 and associated results, where the work data 160 is processed using the data processing models 340 remotely at the server 120 or locally at the client device 240 to provide the associated results to be presented on the client devices or further processed.

In some implementations, the server-side module 106 acts as a control layer or API to the underlying functionality. In some implementations, the server-side module includes one or more of an emitter modulation module, a signal detection module, an object detection module, a location module, a movement module, a depth mapping module, and/or a gesture determination module for a smart device 280. Some implementations implement all of these features at a server system 120, some implementations implement all of these features at the camera 110, and some implementations distribute the functionality between the server 120 and the imaging device (e.g., based on efficiency considerations). In some implementations, the server-side module 206 includes a response processing module, which receives either raw unprocessed signals received at an camera 110 or signals that have been preprocessed by a local response processing module at the camera 110. The response processing module prepares the work data 160 (e.g., time of flight detection data) for use by the location module, the movement module, the depth mapping, and/or the gesture determination module. The server-side module 206 also includes an account administration module, which enables users to set up smart work environments 100 and to identify the smart devices 204 associated with the smart work environment 100.

Although many aspects of the present technology are described from the perspective of a computer system as a whole, the corresponding actions performed by the client device 240 and/or the server system 120 would be apparent to those of skill in the art. The server-side module 206 and the client-side module 202 are implemented at the server 120 and the client device 240, respectively. Each of the other modules 314-328 may be implemented in any of a server 120, a client device 240 (e.g., computer device 118, 130, or 134 in FIG. 1), a smart device 280 (e.g., devices 102-114 in FIG. 1), a storage 116, or a combination thereof.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, modules, or data structures, and thus various subsets of these modules may be combined or otherwise rearranged in various implementations. In some implementations, the memory 306 stores a subset of the modules and data structures identified above. In some implementations, the memory 306 stores additional modules and data structures not described above.

Figure 7:
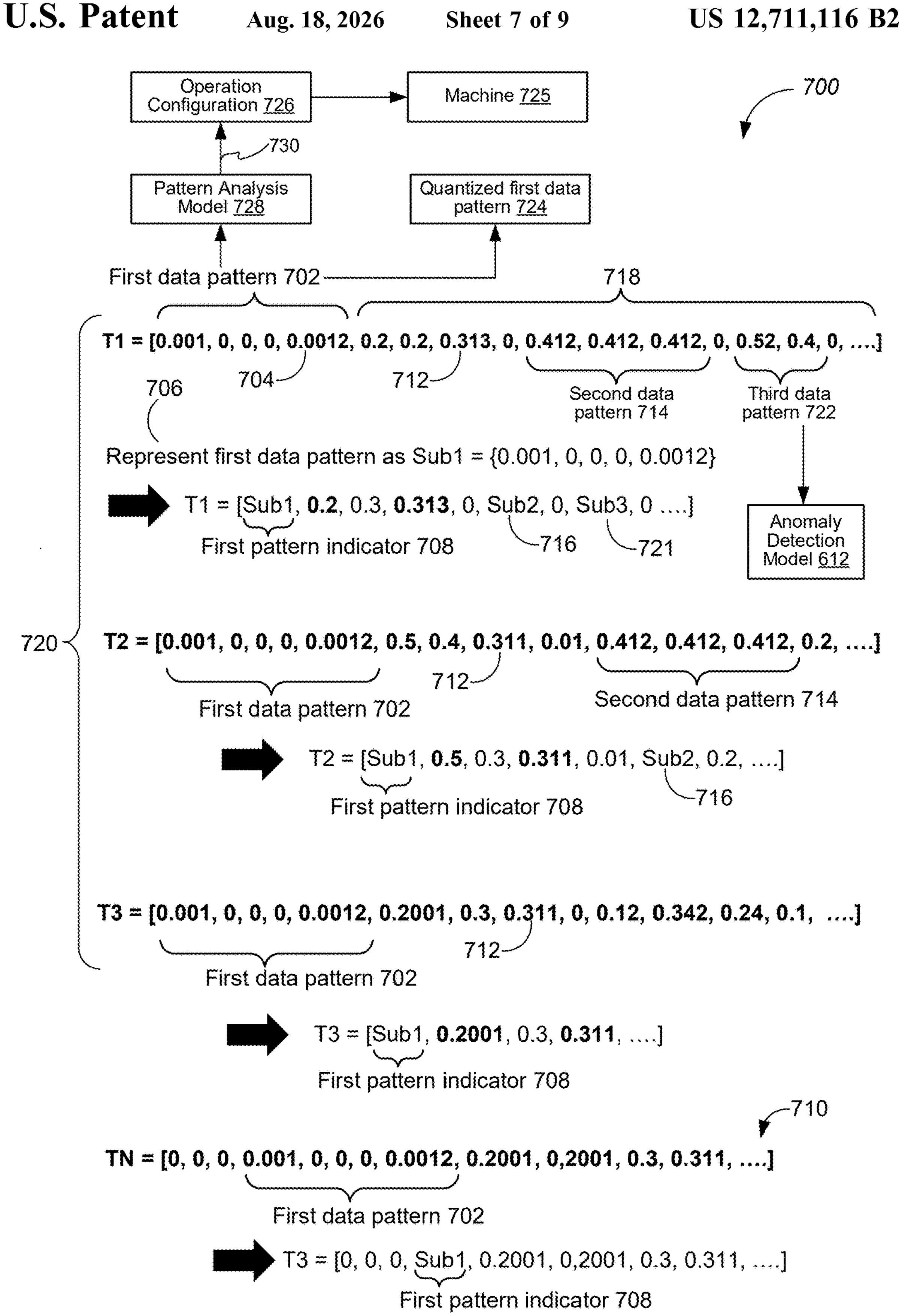
FIG. 7 is a diagram depicting three example time-series data sets sharing one or more data patterns, in accordance with some embodiments.

FIG. 4 is a block diagram of a machine learning system 400 for training and applying data processing models 340 using machine learning, in accordance with some embodiments. The machine learning system 400 includes a model training module 326 establishing one or more data processing models 340 and a data processing module 328 for processing data collected by smart devices 280 (e.g., cameras 110) using the data processing model 340. In some embodiments, both the model training module 326 (e.g., the model training module 326 in FIG. 3) and the data processing module 328 are located in the server 120, while a training data source 404 provides training data 338 to the server 120. In some embodiments, the training data source 404 is the data obtained from the smart devices 280, from another server 120, from storage 106, or from a client device. Alternatively, in some embodiments, the model training module 326 (e.g., the model training module 326 in FIG. 3) is located at a server 120, and the data processing module 328 is located in a smart device 280 or a client device 240. The server 120 trains the data processing models 328 and provides the trained models 340 to a smart device 280 or a client device 240 to process real-time work data 160 captured by the smart device 280. Examples of the data processing model 340 include, but are not limited to, an anomaly detection model 612 (FIG. 6) and a pattern analysis model 728 (FIG. 7).

In some embodiments, the training data 338 provided by the training data source 404 include a standard dataset (e.g., a set of work site images) widely used by engineers in an associated industry to train data processing models 340. In some embodiments, the training data 338 includes work data 160 and/or additional work site information, which is collected from one or more smart devices that will apply the data processing models 340 or collected from distinct smart devices that will not apply the data processing models 340. Further, in some embodiments, a subset of the training data 338 is modified to augment the training data 338. The subset of modified training data is used in place of or jointly with the subset of training data 338 to train the data processing models 340.

In some embodiments, the model training module 326 includes a model training engine 410, and a loss control module 412. Each data processing model 340 is trained by the model training engine 410 to process corresponding work data 160. Specifically, the model training engine 410 receives the training data 338 corresponding to a data processing model 340 to be trained, and processes the training data to build the data processing model 340. In some embodiments, during this process, the loss control module 412 monitors a loss function comparing the output associated with the respective training data item to a ground truth of the respective training data item. In these embodiments, the model training engine 410 modifies the data processing models 340 to reduce the loss, until the loss function satisfies a loss criteria (e.g., a comparison result of the loss function is minimized or reduced below a loss threshold). The data processing models 340 are thereby trained and provided to the data processing module 328 to process work data 160.

In some embodiments, the model training module 326 further includes a data pre-processing module 408 configured to pre-process the training data 338 before the training data 338 is used by the model training engine 410 to train a data processing model 340. For example, an image preprocessing module 408 is configured to format images in the training data 338 into a predefined image format. For example, the preprocessing module 408 may normalize the images to a fixed size, resolution, or contrast level. In another example, an image pre-processing module 408 extracts a region of interest (ROI) corresponding to a target area or object in each image or separates content of the target area or object into a distinct image.

In some embodiments, the model training module 326 uses supervised learning in which the training data 338 is labelled and includes a desired output for each training data item (also called the ground truth in some situations). In some embodiments, the desirable output is labelled manually by people or labelled automatically by the model training model 326 before training. In some embodiments, the model training module 326 uses unsupervised learning in which the training data 338 is not labelled. The model training module 326 is configured to identify previously undetected patterns in the training data 338 without preexisting labels and with little or no human supervision. Additionally, in some embodiments, the model training module 326 uses partially supervised learning in which the training data is partially labelled.

In some embodiments, the data processing module 328 includes a data pre-processing module 414, a model-based processing module 416, and a data post-processing module 418. The data pre-processing modules 414 pre-processes work data 160 based on the type of the work data 160. In some embodiments, functions of the data pre-processing modules 414 are consistent with those of the pre-processing module 408, and convert the work data 160 into a predefined data format that is suitable for the inputs of the model-based processing module 416. The model-based processing module 416 applies the trained data processing model 340 provided by the model training module 326 to process the pre-processed work data 160. In some embodiments, the model-based processing module 416 also monitors an error indicator to determine whether the work data 160 has been properly processed in the data processing model 340. In some embodiments, the processed work data is further processed by the data post-processing module 418 to create a preferred format or to provide additional work information, associated with the smart work environment 100, which can be derived from the processed work data.

In some embodiments, work data 160 are supplemented with other information 402 (e.g., additional work site information, which is collected from one or more smart devices that will apply the data processing models 340 or collected from distinct smart devices that will not apply the data processing models 340). In some embodiments, the data processing module 328 uses the processed work data (e.g., result 420) to at least partially autonomously control an equipment or tool (e.g., forklift 126 in FIG. 1) that operates in the smart work environment 100. For example, the processed work data includes control instructions that are used by a control system (manned or unmanned) to drive the forklift 126. In some embodiments, the processed work data (e.g., result 420) is applied to at least partially autonomously control a robot operating on a vehicle assembly line (FIG. 10A) or in an electronics manufacturing facility (FIG. 10B).

FIG. 5A is a structural diagram of an example neural network 500 applied to process work data in a data processing model 340, in accordance with some embodiments, and FIG. 5B is an example node 520 in the neural network 500, in accordance with some embodiments. It should be noted that this description is used as an example only, and other types or configurations may be used to implement the embodiments described herein. The data processing model 340 is established based on the neural network 500. A corresponding model-based processing module 416 applies the data processing model 340 including the neural network 500 to process work data 160 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a data processing model 340 to process work data (e.g., video and image data captured by cameras 110). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the data processing model 340 to process work data 160. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of work data are processed by the data processing module 328, and two or more types of neural networks (e.g., both a CNN and an RNN) are applied in the same data processing model 340 to process the work data jointly.

The training process is a process for calibrating all of the weights $w_i$ for each layer of the neural network 500 using training data 338 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

In some example manufacturing processes, complex data objects generated by robots are captured to monitor each robotic operation. A plurality of data objects are generated and stored every day. When a large portion of the robotic operations are completed properly without any error, their corresponding data objects follow a certain data pattern with variations that fall within a tolerance. These data objects corresponding to the robotic operations are highly repeating, and could be redundant and not useful.

FIG. 6 is a plot 600 of one or more example correlation curves 620 between a voltage 602 and a current 604 measured in spot welding operations, in accordance with some embodiments. A spotwelding robot controller captures time-series data for each spot welding operation, and the time-series data correspond to a plurality of temporal curves (e.g., current, voltage, resistance curves, which are not shown in FIG. 6). For example, the spotwelding robot controller obtains a first time-series data set 601 for the voltage 602 corresponding to a voltage temporal curve (not shown), and a second time-series data set 603 for the current 604 corresponding to a current temporal curve (not shown). In an example, each spot welding operation lasts 1.5 second, so do the associated curves span up to 1.5 second. In some embodiments, values of the voltage 602 and the current 604 corresponding to each timestamp are represented on the same plot 600 including one or more correlation curves 620 between the voltage 602 and the current 604.

In some implementations, each spot welding operation is implemented in three phases: a squeezing phase 606, a welding and holding phase 608, and an off-time phase 610. Experts expect more defects to occur in the welding and holding phase 608 than in the squeezing phase 606 or the off-time phase 610. In some situations, a computer system 300 is instructed to identify the defects in the spot welding operations, and approximately two thirds of the data is not useful. Data collected in the squeezing phase 606 and the off-time phase 610 are most probably redundant data and do not need to be stored. Before any efficient algorithm is applied to determine whether the data collected in the squeezing phase 606 and the off-time phase 610 correspond to defects, the data collected in the squeezing phase 606 and the off-time phase 610 may be compressed based on their common data patterns 614.

In some embodiments, one of the correlation curves 620 includes a plurality of feature points A to K defining a plurality of data segments AB, BC, CD, DE, EF, FG, GH, HI, IJ, and JK. The squeezing phase 606 corresponds to data segments AB, BC, and CD, and the welding and holding phase 608 corresponds to data segments DE, EF, FG, GH, and HI. The off-time phase 610 corresponds to data segments IJ and JK. Each data segment corresponds to a respective data pattern, and the associated voltage values and current values are stored with the respective data pattern. For each spot welding operation, the first time-series data set 601 for the voltage 602 and the second time-series data set 603 for the current 604 are represented with data pattern indicators 640 for the corresponding data segments. For example, for a spot welding operation corresponding to a curve 620A, the first time-series data set 601 for the voltage 602 is represented with the data pattern indicators 640 for the data segments AB, BC, CD, DE, EF, FG, GH, HI, IJ, and JK. In another example, for a distinct spot welding operation corresponding to a curve 620B, data for the squeezing phase 606 are shifted, and the first time-series data set 601' for the voltage 602 is represented with the data pattern indicators 640 for the data segments A'B', B'C, CD, DE, EF, FG, GH, HI, IJ, and JK.

In some embodiments, one of the data patterns 614 is identified in the first time-series data set 601 for the voltage 602 in a single spot welding operation. Alternatively, in some embodiments, a subset of the data patterns 614 is identified across a plurality of spot welding operations and associated phases 608-610. The plurality of spot welding operations may be implemented during a single work shift on a factory floor. The plurality of spot welding operations may be implemented during different work shifts on the factory floor. During each work shift, the spot welding operations are continuously implemented with or without breaks, e.g., lasting for time durations lower than a threshold duration. Two work shifts are separated by a downtime duration, e.g., longer than the threshold duration.

In some embodiments, machine learning is applied to detect data phases and patterns in a time-series data set 601 or 603. Time-series data are compressed based on data phases and patterns, allowing for complete data recovery. In some embodiments, one or more data patterns 614 are stored, and each time-series data set 601 or 603 is at least partially represented using the one or more data patterns. In some embodiments, a data pattern 614 corresponds to a data signature represented in an abbreviated format (e.g., a feature index selecting a predefined curve stored in a database). When the computer system 300 identifies the feature index in a time-series data set, a corresponding set of successive data items is synthesized based on the predefined curve identified by the feature index. In some embodiments, the computer system 300 identifies a unique data pattern 614U (e.g., corresponding to data segment A'B') that is used in one or more time-series data set 601' (e.g., not in all time-series data sets), and determines that the unique data pattern 614U is associated with an anomality. The unique data pattern 614U is applied to train an anomaly detection model 612 for detecting the anomality or an unsupervised machine learning model.

In some situations, time-series data are cyclical. In some situations, there is a downtime when the time-series data are interrupted, which may indicate an intermission between two work shifts. Alternatively, in some embodiments associated with a health and wellness application, a fitness watch stops reporting heart rate data, indicating that a user is taking a shower or having a battery charging routine. In an example, the time-series data correspond to a spot welding operation including phases 606-610, which are repeated in a factory during a work shift.

In some embodiments, each phase (e.g., phase 608) corresponds to a subset of time-series data and associated data segments in a respective time duration, and the subset of time-series data are substantially similar across the respective time durations of different spot welding operations (e.g., implemented by the same robotic arm). In some embodiments, a data pattern 614 is identified for the subset of time-series data of the respective phase of different spot welding operations. For example, a manufacturing line starts a new run of spot welding operations at the beginning of each work shift, and time-series data collected at the beginning of two work shifts may have common data patterns 614. That said, in some embodiments, the one or more data patterns 614 are detected based on time-series data 601 or 603 collected within a predefined number of operations after a start of a work shift of associated operations (e.g., within the first 100 operations of each work shift), and applied to compress the time-series data 601 or 603 collected during a remainder of the work shift.

FIG. 7 is a diagram 700 depicting three example time-series data sets 720 (e.g., including T1, T2, and T3) sharing one or more data patterns (e.g., a first data pattern 702), in accordance with some embodiments. A computer system 300 (e.g., a server 120, a storage device 116, a smart device 280) obtains a plurality of time-series data sets 720 from an electronic device (e.g., a thermostat 104 in FIG. 1). Each time-series data set 720 includes a temporally indexed sequence of data items 704, and each data item 704 is associated with a respective timestamp. In some embodiments, each data item 704 includes one of: a data value of a data field (FIG. 7), two or more data values of two or more data fields, a value of a variable, a container of data, structured data, and a vector with vector elements. A first data pattern 702 is shared by the plurality of time-series data sets 720, and includes a first subset of successive data items, e.g., "0.001, 0, 0, 0.0012" in data sets T1, T2, and T3. The computer system 300 represents (operation 706) the first data pattern 702 with a first pattern indicator 708 (Sub1). The first pattern indicator 708 (Sub1) is applied in place of the first subset of successive data values corresponding to the first data pattern 702 in each of the plurality of time-series data sets 720 (e.g., T1, T2, and T3). The computer system 300 stores the first data pattern 702 and the plurality of time-series data sets 720 each of which includes the first pattern indicator 708 (Sub1). In this example, a copy of the first data pattern 702 is stored, and the first pattern indicator 708 represents the first data pattern 702 in each of the plurality of time-series data sets 720, thereby conserving at least storage space needed to store the time-series data sets 720.

In some embodiments, the computer system 300 obtains a new time-series data set 710 (TN) and determines that the new time-series data set 710 (TN) includes a portion that corresponds to the first data pattern 702. The portion of the new time-series data set 710 corresponding to the first data pattern 702 is replaced with the first pattern indicator 708 (Sub1).

In some embodiments, the first subset of successive data items corresponding to the first data pattern 702 has a respective temporal location in each of the plurality of time-series data sets 720. In some embodiments, respective temporal locations of the first data pattern 702 may vary in the plurality of time-series data sets 720. Conversely, in some embodiments, respective temporal locations of the first data pattern 702 in the plurality of time-series data sets 720 are aligned with one another. Stated another way, the temporal location is fixed in each time-series data set 720, and corresponds to the same temporal index, e.g., measured starting from a beginning of each work shift of spot welding operations. In an example (FIG. 7), the respective temporal location of the first data pattern 702 corresponds to the first four timestamps located at a beginning of each data set 720. In another example, an alternative data pattern 712 includes a single data item (e.g., "0.311"), and has a respective temporal location corresponding to the seventh timestamp in each time-series data set 720.

In some embodiments, the computer system 100 identifies a second data pattern 714 (e.g., "0.412, 0.412, 0.412") that is shared by a subset of two or more time-series data sets (e.g., T1 and T2) of the plurality of time-series data sets 720. The second data pattern 714 is distinct from the first data pattern 702 and includes a second subset of successive data items. The subset of two or more time-series data sets (e.g., T1 and T2) includes less than all of the plurality of time-series data sets 720 (e.g., including at least T1, T2, and T3). Further, in some embodiments, a second pattern indicator 716 is applied in place of the second subset of successive data items corresponding to the second data pattern 714 (Sub2) in each of the subset of two or more time-series data sets (e.g., T1, T2). Each of the second subset of successive time-series data sets (e.g., T1, T2) is stored with the second pattern indicator 716 (Sub2) in place of the second data pattern 714.

In some embodiments, the plurality of time-series data sets 720 include a first time-series data set T1 including the first subset of successive data items corresponding to the first data pattern 702 and a remainder set of data items 718. The remainder set of data items 718 is represented with one or more pattern indicators. The one or more pattern indicators include a third pattern indicator 721 (Sub3) corresponding to a third data pattern 722, and the third pattern indicator 721 (Sub3) corresponds to a third subset of one or more successive data items that appears at a corresponding temporal location within the first time-series data set T1. In an example, the third subset of one or more successive data items only appears in the first time-series data set T1, and does not appear within each remainder time-series data set T2 or T3 distinct from the first time-series data set T1.

Further, in some embodiments, the third subset of one or more successive data items corresponding to the third data pattern 722 is added into a corpus of training data items to be used by a machine learning system to generate an anomaly detection model 612 (FIG. 6) for detecting anomalies in a physical process detected by the electronic device that collects the plurality of time-series data sets 720. The third subset of one or more successive data items corresponding to the third data pattern 722 is a unique data set that only occurs in the first time-series data set T1, and may be associated with an anomaly. As such, the third subset of successive data items may be used to augment the training dataset to train the anomaly detection model 612 efficiently.

Alternatively and additionally, in some embodiments, the computer system 300 modifies at least one data item in the third subset of one or more successive data items, corresponding to the third data pattern 722, to generate synthetic training data having a modified subset of one or more successive data items. The synthetic training data are added into a corpus of training data items to be used by a machine learning system to generate an anomaly detection model 612 for detecting anomalies in a physical process detected by the electronic device.

In some embodiments, each of the first subset of successive data items of the first data pattern 702 has a respective data value (e.g., 0.001, 0, 0.0012). The plurality of time-series data sets 720 have a fixed value (e.g., 0.001, 0, 0.0012) for each data item in the first data pattern 702. For each time-series data set 720 (e.g., T1, T2, or T3), the computer system 300 determines that the respective time-series data set 720 (e.g., T1, T2, or T3) includes a respective set of successive data items, and each data item of which is equal to the respective data value of a corresponding data item of the first subset of successive data items of the first data pattern 702.

In some embodiments, each of the first subset of successive data items of the first data pattern 702 has a respective value tolerance range (e.g., 0.0008-0.0012 for 0.001). Each data item in the first data pattern has a respective tolerance range. For each of the plurality of time-series data sets 720 (e.g., T1, T2, or T3), the computer system 300 determines that the respective time-series data set 720 (e.g., T1, T2, or T3) includes a respective set of successive data items, each data item of which is within the respective value tolerance range of a corresponding data item of the first subset of successive data items of the first data pattern 702.

In some embodiments, each of the first subset of successive data items of the first data pattern 702 has a respective data change rate (e.g., associated with a first order derivative, a second order derivative, or an Nth order derivative of the successive data items). In an example not shown, the first data pattern 702 corresponds to both data segments AB and A'B' having matching data change rates, but with a temporal shift. For each of the plurality of time-series data sets 720 (e.g., T1, T2, or T3), the computer system 300 determines that the respective time-series data set 720 (e.g., T1, T2, or T3) includes a respective set of successive data items, each data item of which is equal to, or within a respective change tolerance range of, the respective data change rate of a corresponding data item of the first subset of successive data items of the first data pattern 702. In an example, each data item in the respective set of successive data items has a respective fixed data change rate. In another example, each data item in the respective set of successive data items has a respective data change rate that is not entirely fixed, but varies within a respective change tolerance range of a respective fixed data change rate.

In some embodiments, when the first data pattern 702 is stored, e.g., in a storage device 116 of the computer system 300, each data item of the first subset of successive data items of the first data pattern 702 is quantized to generate a quantized first data pattern 724, which is further stored. For example, the data items of the first data pattern 702 captured by the electronic device has a 32-b resolution, and is quantized based a 16-b resolution, further conserving storage space by storing the first data pattern 702 in a compressed format.

In some embodiments, the electronic device that collects the plurality of time-series data sets 720 is part of a machine 725 (e.g., an automatic spot welding robotic machine). The computer system 300 obtains the plurality of time-series data sets 720 by obtaining each of the plurality of time-series data sets 720 from the electronic device, while the machine is implementing a respective robotic operation (e.g., a spot welding operation discussed above with reference to FIG. 6) according to a predefined operation configuration 726. Further, in some embodiments, a pattern analysis model 728 is applied to process the first data pattern 702 and generate a pattern control output 730. The predefined operation configuration 726 of the machine 725 is adjusted based on the pattern control output 730.

Alternatively and additionally, in some embodiments, at least one data item is modified in the first subset of one or more successive data items, corresponding to the first pattern indicator 708, to generate a modified first subset of one or more successive data items. The modified first subset of one or more successive data items is added into a corpus of training data items for training a pattern analysis model 728.

It is known to people having ordinary skilled in the art that the data items shown in FIG. 7 are merely examples that are not intended for limiting implementations of this application. A data patterns 702 is not limited to one to four data items and include more than four data items (e.g., 1000 data items successively captured or sampled from data points measured by the electronic device).

In some embodiments, the computer system 300 identifies the first data pattern 702 in the plurality of time-series data sets 720 by identifying similarities among subsets of the plurality of time-series data sets 720. Each time-series data set 720 is captured and stored for a respective process (e.g., a work shift including a plurality of successive soft welding operations). In an example, a time-series data set 720 corresponds to a screwdriving process including one or more screwdriving operations administered by a robot, and includes a temporal sequence of torque values or angle values. The time-series data set 720 corresponds to a torque or angle curve tracking a respective one of a plurality of phases of the screwdriving process. Under some circumstances, each of the plurality of phases of the screwdriving process does not have a fixed length in time due to a variation of a physical environment. The computer system 300 may identify the plurality of phases of the plurality of phases of the screwdriving process, e.g., automatically and in a dynamic manner. In some implementations, the computer system 300 receives a user input adding a text label to a phase of the screwdriving process, thereby expediting detection of the phase and associated data pattern of the screwdriving process.

In some embodiments, each of the plurality of time-series data sets 720 starts to be recorded from a beginning of a respective process. A leading portion of each time-series data set 720 and corresponds to a portion of the respective process, and is applied to determine data patterns. For example, the leading portion of each time-series data set 720 corresponds to a starting portion (e.g., the initial 5%) of a work shift of a soft welding process, and is applied to determine a plurality of data patterns, which are further used to represent a remainder (e.g., 95%) of the respective time-series data set 720. In some embodiments, the leading portions of the plurality of time-series data sets 720 are processed to identify their similarities, and the data patterns (e.g., data patterns 702 and 714) are identified based on the identified similarities.

For example, the time-series data sets 720 (T1, T2, and T3) are compared to determine that a first data item (e.g., "0.001") is shared among the time-series data sets 720. A first data pattern 702 includes the first data item and is successively extended to include the next four data items as the next four data items (e.g., "0, 0, 0, 0.0012") are determined to be identical or substantially similar among the time-series data sets 720 (T1, T2, and T3). In accordance with a determination that a degree of similarity drops below a certain similarity threshold (e.g., starting at a sixth data item), the computer system 300 rolls back to a immediately preceding data item (e.g., the fifth data item) and use the preceding data item to identify the first data pattern 702 or an associated phase. Alternatively, in some embodiments, data chunks (e.g., the first ten data items) of the time-series data sets 720 are initially compared to determine the phase and the first data pattern 702. If the data chunks are not similar or rank low on similarity, the computer system 300 successively decreases the size of the data chunks (e.g., from ten data items to nine, eight, seven, . . . data items) until the data chunks are identical or substantially similar (e.g., the degree of similarity reaches the certain similarity threshold).

In some embodiments, after the first data pattern 702 is identified, the computer system 300 continues to determine data patterns following the first data pattern 702 in each time-series data set 720. For example, the alternative data pattern 712 is identified as the next common data pattern that exist in the plurality of time-series data sets 720. In some embodiments, a data pattern (e.g., the second data pattern 714) is only shared in less than all of the plurality of time-series data sets 720. In some embodiments, a data pattern (e.g., the third data pattern 722) is only used in a single time-series data set (e.g., in the first time-series data set T1).

In some embodiments, a phase of a time-series data set 720 includes a single data pattern. Alternatively, in some embodiments, a phase of a time-series data set 720 includes more than one data pattern. Referring back to FIG. 6, in some implementations, a plurality of phases 608-610 are identified, and for each phase, one or more data patterns (e.g., corresponding to different data segments) are further determined. Alternatively, in some embodiments, data patterns (e.g., corresponding to different data segments) are determined, before the data patterns are grouped to form different phases.

In some embodiments associated with screwdriving operations, a continuous process corresponds to a time-series data set 720 including 1000 numerical values (e.g., on a torque curve). The process is divided into a number of phases (e.g., 20 phases). Each phase corresponds to a screwdriving operation, and is tracked by a curve portion that is identical to or substantially similar to other curve portions corresponding to remaining screwdriving operations. For example, three time-series data sets X1, X2, and X3 correspond to three distinct torque vectors as follows:

$$X1 = [0.001, 0, 0, 0, 0.0012, 0.2, 0.3, 0.313, \ldots];$$

$$X2 = [0.001, 0, 0, 0, 0.0012, 0.5, 0.3, 0.311, \ldots]; \text{ and}$$

$$X3 = [0.001, 0, 0, 0, 0.0012, 0.2001, 0.3, 0.311, \ldots],$$

which are further represented as:

$$X1 = DP1, DP2, DP3, DP4, \ldots;$$

-continued $$X2 = DP1, DP5, DP3, DP6, \ldots; \text{ and}$$

$$X3 = DP1, DP2, DP3, DP4, \ldots.$$

where DP1, DP2, DP3, DP5, and DP6 are data patterns identified in the time-series data sets X1, X2, and X3. More specifically, DP1, DP2, DP3, DP5, and DP6 are represented and stored as follows:

$$DP1 = [0.001, 0, 0, 0, 0.0012];$$

$$DP2 = [0.2];$$

$$DP3 = [0.3];$$

$$DP4 = [0.313];$$

$$DP5 = [0.5]; \text{ and}$$

$$DP6 = [0.311].$$

In some embodiments, after the first data pattern 702 is represented or replaced by a first pattern indicator 708, the first time-series data set T1 is stored as a combination of the first pattern indicator 708 (Sub1) and one or more original data items that are not represented by any pattern indicators. In some embodiments, after the first data pattern 702 is represented or replaced by a first pattern indicator 708, the first time-series data set T1 is stored as a sequence of pattern indicators including the first pattern indicator 708 (Sub1). In some embodiments, the first data pattern 702 shows up in the first time-series data set T1 only once. In some embodiments not shown, the first data pattern 702 shows up in the first time-series data set T1 more than once, e.g., periodically.

In some embodiments, the first data pattern 702 includes a single data item, which is replaced with the first pattern indicator 708 without compression. Alternatively, in some embodiments, the first data pattern 702 includes more than one data item. In some embodiments, the computer system 300 stores data items of the first data pattern 702 with a data precision (also called data sensitivity or accuracy), e.g., 32-b, 16-b, a decimal precision. In an example, For example, based on a decimal precision, the computer system 300 may stores 0.311 and 0.313 as two distinct data items, and not differentiate 0.2 and 0.2001 during the course of determining the first data pattern 702 and storing the first data pattern 702. The data precision may be inputted to the computer system 300 by a user or learned based on the time-series data sets 720 (e.g., based on their associated variability).

In some embodiments, the computer system 300 analyzes an initial portion (e.g., 5%) of data items recorded for a work shift or a day to determine data patterns, In some embodiments, the computer system 300 analyzes large phases of time such as an entire work shift in manufacturing or a day for wellness applications to identify data patterns, thereby determining a list of data patterns that is more thorough compared with when only the initial portion of data items are used. Based on the list of data pattern that are more thorough, the time-series data sets may be compressed at a higher compression ratio (e.g., equal to a ratio of an original time-series data set and a compressed size of a compressed time-series data set). In some embodiments, data pattern based compression is not lossy. Alternatively, in some embodiments, data pattern based compression is lossy, if the computer system 300 reduces a data precision while representing data patterns with data pattern indicators.

In some embodiments, the plurality of time-series data sets 720 include a plurality of data patterns that are represented with a plurality of distinct pattern indicators (e.g., pattern indicators 708, 716, and 721). Each of the plurality of distinct pattern indicators may has a predefined number of bits (e.g., 8b) and include a distinct integer number, e.g., which is increased successively as more and more data patterns are generated. For example, the first pattern indicator 708 is 0000 0100, and the second pattern indicator 716 is 0000 0101. The third pattern indicator 0000 0110.

In some embodiments, a usage frequency is determined for each of a plurality of data patterns used in the plurality of time-series data sets. One or more data patterns are extracted based on respective usage frequencies, and used to train a machine learning model, thereby making a training process converge and produce the model that can be generalize and scaled. In an example, a data pattern has a relatively large usage frequency (e.g., the highest usage frequency). In another example, a data pattern has a relatively small usage frequency and corresponds to an anomaly. The data pattern is applied to train an anomaly detection model 612 (FIG. 6).

Figure 8A:
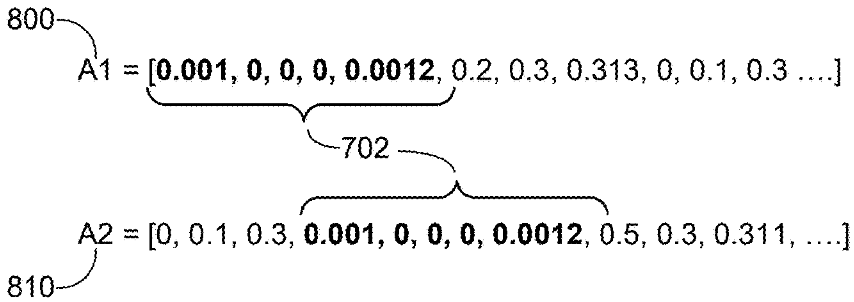
FIG. 8A illustrates two example time-series data sets where a first data pattern is identified based on time warping, in accordance with some embodiments.

FIG. 8A illustrates two example time-series data sets 800 and 810 where a first data pattern 702 is identified based on time warping, in accordance with some embodiments. The first data pattern 702 is shared by a plurality of time-series data sets 720 and replaced by a first pattern indicator 708. In an example, the plurality of time-series data sets 720 include the time-series sets 800 and 810. The first data pattern 702 corresponds to two distinct temporal locations in the time-series sets 800 and 810. Dynamic time warping is applied to identify the first data pattern 702 at a first temporal location (e.g., ranging from the first timestamp to the fourth timestamp) in a first time-series data set 800 and at a second temporal location (e.g., ranging from the fourth timestamp to the seventh timestamp) in a second time-series data set 810, respectively. The second temporal location is distinct from the first temporal location.

Figure 8B:
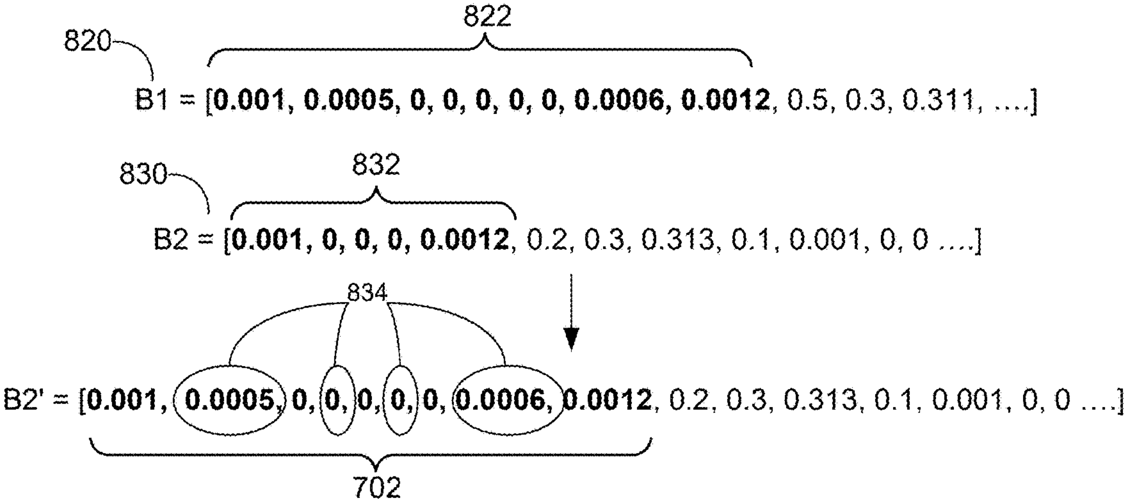
FIG. 8B illustrates two example time-series data sets where a first data pattern is identified based on data pattern stretching, in accordance with some embodiments.

FIG. 8B illustrates two example time-series data sets 820 and 830 where a first data pattern 702 is identified based on data pattern stretching, in accordance with some embodiments. The first data pattern 702 is shared by a plurality of time-series data sets 720 and replaced by a first pattern indicator 708. In an example, the plurality of time-series data sets 720 include the time-series sets 820 and 830. The first data pattern 702 corresponds to data segments having two different lengths in the time-series sets 820 and 830. The computer system 300 determines that the first data pattern 702 corresponds to a first data segment 822 in a first time-series data set 820. The first data pattern 702 has a pattern length (e.g., nine data items), and the first data segment has a first length (e.g., nine data items) equal to the pattern length. The computer system 300 determines that the first data pattern 702 corresponds to a second data segment 832 in a second time-series data set 830 by stretching a length (e.g., five data items) of the second data segment 832 to match the pattern length of the first data pattern 702 and adding (e.g., by linear interpolation) one or more data items 834 to supplement the second data segment 832 of the second time-series data set 830 to match the first data pattern 702.

Figure 8C:
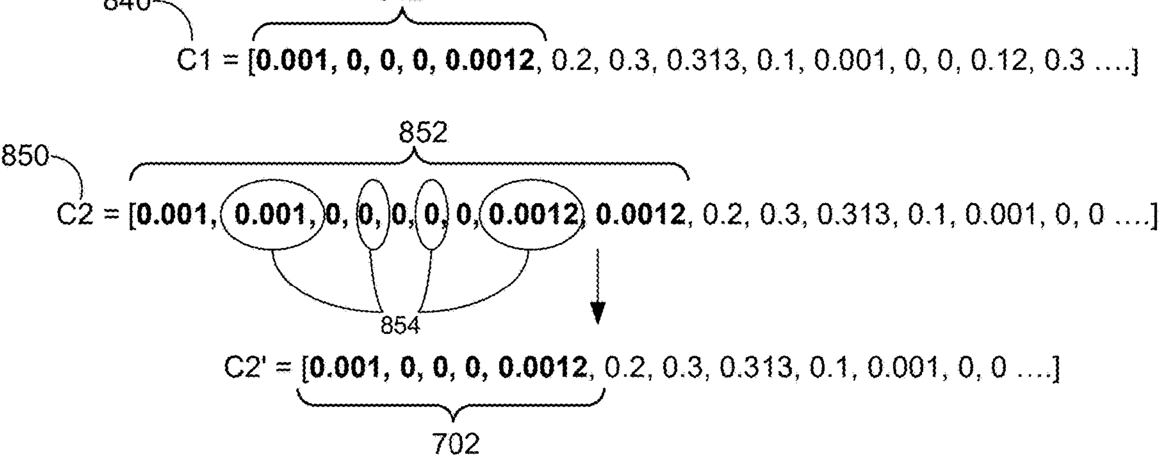
FIG. 8C illustrates two example time-series data sets where a first data pattern is identified based on data pattern down-samplings, in accordance with some embodiments.

FIG. 8C illustrates two example time-series data sets 840 and 850 where a first data pattern 702 is identified based on data pattern down-samplings, in accordance with some embodiments. The first data pattern 702 is shared by a plurality of time-series data sets 720 and replaced by a first pattern indicator 708. In an example, the plurality of time-series data sets 720 include the time-series sets 840 and 850. The first data pattern 702 corresponds to data segments having two different lengths in the time-series sets 840 and 850. The computer system 300 determines that the first data pattern 702 corresponds to a first data segment 842 in a first time-series data set 840. The first data pattern 702 has a pattern length (e.g., four data items), and the first data segment 842 has a first length (e.g., four data items) equal to the pattern length. The computer system 300 determines that the first data pattern 702 corresponds to a second data segment 852 in a second time-series data set 850 by scaling down a length (e.g., nine data items) of the second data segment 852 to match the first length of the first data pattern and removing one or more data items 854 to match the second data segment 852 of the second time-series data set 850 to the first data pattern 702.

Figure 9:
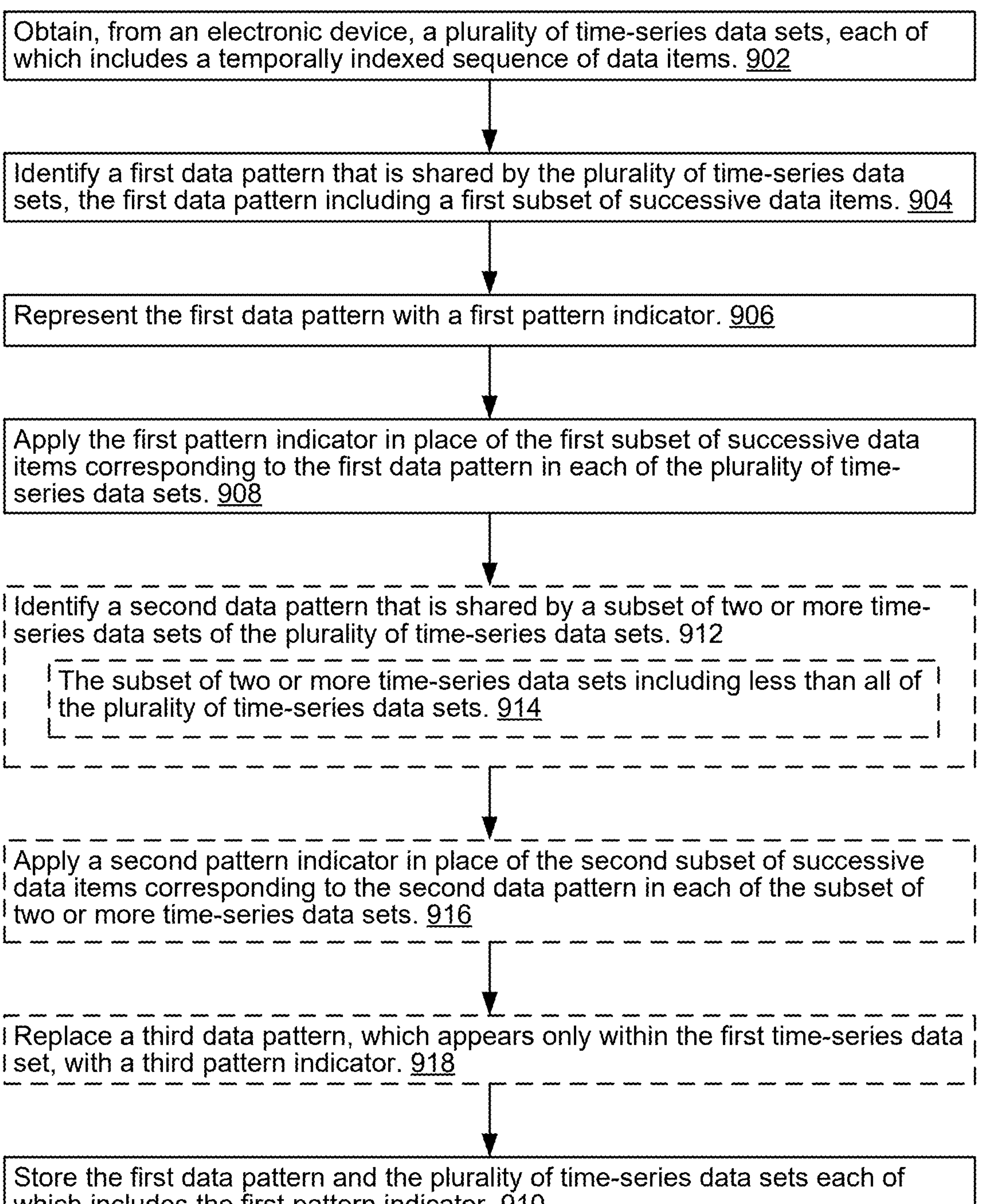
FIG. 9 is a flow diagram of an example data management method, in accordance with some embodiments.

FIG. 9 is a flow diagram of an example data management method 900 (e.g., for compressing time-series data), in accordance with some embodiments. For convenience, the method 900 is described as being implemented by a computer system 300 (e.g., a data processing module 328 (FIG. 3) of a server 120, a client device 240, a smart device 280, a storage device 116, or a combination thereof). Method 900 is, optionally, governed by instructions that are stored in a non-transitory computer readable storage medium and that are executed by one or more processors of the computer system. Each of the operations shown in FIG. 9 may correspond to instructions stored in a computer memory or non-transitory computer readable storage medium (e.g., memory 306 in FIG. 3). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 900 may be combined and/or the order of some operations may be changed.

A computer system 300 obtains (operation 902) a plurality of time-series data sets 720 from an electronic device (e.g., a sensor device), and each time-series data set 720 (e.g., in FIG. 7) includes a temporally indexed sequence of data items. The computer system 300 identifies (operation 904) a first data pattern 702 that is shared by the plurality of time-series data sets 720, and the first data pattern 702 includes a first subset of successive data items. The computer system 300 represents (operation 906) the first data pattern 702 with a first pattern indicator 708, applies (operation 908) the first pattern indicator 708 in place of the first subset of successive data items corresponding to the first data pattern 702 in each of the plurality of time-series data sets 720, and stores (operation 910) the first data pattern 702 and the plurality of time-series data sets 720 each of which includes the first pattern indicator 708. In some embodiments, a copy of the first data pattern 702 is stored, and the first pattern indicator 708 is repeatedly stored with each of the plurality of time-series data sets 720. Memory space is conserved from storing the first data pattern 702 for more than one time, and communication bandwidth is conserved from transferring the copy of the first data pattern 702 repeatedly.

In some embodiments, the computer system 300 obtains a new time-series data set 710 (e.g., in FIG. 7), determines that the new time-series data set 710 includes a portion that corresponds to the first data pattern 702, and replaces the portion of the new time-series data set 710 corresponding to the first data pattern 702 with the first pattern indicator 708.

In some embodiments, the first subset of successive data items corresponding to the first data pattern 702 has a respective temporal location in each of the plurality of time-series data sets 720, and respective temporal locations of the first data pattern 702 in the plurality of time-series data sets 720 are aligned with one another.

In some embodiments, the computer system 300 identifies (operation 912) a second data pattern 714 that is shared by a subset of two or more time-series data sets (e.g., T1 and T2 in FIG. 7) of the plurality of time-series data sets 720. The second data pattern 714 is distinct from the first data pattern 702 and includes a second subset of successive data items, and the subset of two or more time-series data sets includes (operation 914) less than all of the plurality of time-series data sets 720. Further, in some embodiments, the computer system 300 applies (operation 916) a second pattern indicator 716 in place of the second subset of successive data items corresponding to the second data pattern 714 in each of the subset of two or more time-series data sets. Each of the second subset of successive time-series data sets is stored with the second pattern indicator 716 in place of the second data pattern 714.

In some embodiments, the plurality of time-series data sets 720 includes a first time-series data set (e.g., T1 in FIG. 7) including the first subset of successive data items and a remainder set of data items 718. The computer system 300 represents the remainder set of data items 718 with one or more pattern indicators. The one or more pattern indicators include a third pattern indicator 721 (Sub3) representing a third data pattern 722, which corresponds to a third subset of one or more successive data items that appears at a corresponding temporal location within the first time-series data set (e.g. T1). In an example, the third data pattern 722 is replaced (operation 918) with the third pattern indicator 721 (Sub3) appears only within the first time-series data set (e.g., T1). Further, in some embodiments, the computer system 300 adds the third subset of one or more successive data items corresponding to the third data pattern 722 into a corpus of training data items to be used by a machine learning system to generate an anomaly detection model 612 for detecting anomalies in a physical process detected by the electronic device. Alternatively and additionally, in some embodiments, the computer system 300 modifies at least one data item in the third subset of one or more successive data items, corresponding to the third data pattern 722, to generate synthetic training data having a modified subset of one or more successive data items. The synthetic training data are added into a corpus of training data items to be used by a machine learning system to generate an anomaly detection model 612 for detecting anomalies in a physical process detected by the electronic device.

In some embodiments, each of the first subset of successive data items of the first data pattern 702 has a respective data value. For each of the plurality of time-series data sets 720, the computer system 300 determines that the respective time-series data set includes a respective set of successive data items, each data item of which is equal to the respective data value of a corresponding data item of the first subset of successive data items of the first data pattern 702.

In some embodiments, each of the first subset of successive data items of the first data pattern 702 has a respective value tolerance range. For each of the plurality of time-series data sets 720, the computer system 300 determines that the respective time-series data set includes a respective set of successive data items, each data item of which is within the respective value tolerance range of a corresponding data item of the first subset of successive data items of the first data pattern 702.

In some embodiments, each of the first subset of successive data items of the first data pattern 702 has a respective data change rate. For each of the plurality of time-series data sets 720, the computer system 300 determines that the respective time-series data set includes a set of successive data items, each data item of which is equal to, or within a respective change tolerance range of, the respective data change rate of a corresponding data item of the first subset of successive data items of the first data pattern 702.

In some embodiments, the computer system 300 stores the first data pattern 702 by quantizing each data item of the first subset of successive data items of the first data pattern 702 to generate a quantized first data pattern 702 and storing the quantized first data pattern 702.

In some embodiments, the electronic device is part of a machine 725, and the computer system 300 obtains the plurality of time-series data sets 720 by obtaining each of the plurality of time-series data sets 720 from the electronic device, while the machine 725 is implementing a respective robotic operation according to a predefined operation configuration 726. Further, in some embodiments, the computer system 300 applies a pattern analysis model 728 to process the first data pattern 702 and generate a pattern control output 730 and adjusts the predefined operation configuration 726 of the machine 725 based on the pattern control output 730.

In some embodiments, the computer system 300 modifies at least one data item in the first subset of one or more successive data items, corresponding to the first pattern indicator 708, to generate a modified first subset of one or more successive data items. The modified first subset of one or more successive data items is added into a corpus of training data items.

In some embodiments (FIG. 8A), when the computer system 300 identifies the first data pattern 702 that is shared by the plurality of time-series data sets 720, the computer system 300 applies dynamic time warping to identify the first data pattern 702 at a first temporal location in a first time-series data set 800 and at a second temporal location in a second time-series data set 810, respectively. The second temporal location is distinct from the first temporal location.

In some embodiments (FIG. 8B), when the computer system 300 identifies the first data pattern 702 that is shared by the plurality of time-series data sets 720, the computer system 300 determines that the first data pattern 702 corresponding to a first data segment 822 in a first time-series data set 820. A first length of the first data segment 822 is equal to a length of the first data pattern 702. The computer system 300 determines that the first data pattern 702 corresponding to a second data segment 832 in a second time-series data set 830 by stretching a length of the second data segment 832 to match the length of the first data pattern 702 and adding one or more data items 834 to supplement the second data segment 832 of the second time-series data set 830 to match the first data pattern 702.

In some embodiments (FIG. 8C), when the computer system 300 identifies the first data pattern 702 that is shared by the plurality of time-series data sets 720, the computer system 300 determines that the first data pattern 702 corresponding to a first data segment 842 in a first time-series data set 840. A first length of the first data segment 842 is equal to a length of the first data pattern 702. The computer system 300 determines that the first data pattern 702 corresponding to a second data segment 852 in a second time-series data set 850 by scaling down a length of the second data segment 852 to match the length of the first data pattern 702 and removing one or more data items 854 to match the second data segment 852 of the second time-series data set 850 to the first data pattern 702.

In some embodiments, the method 900 is implemented by a memory system (e.g., a storage device 116 in FIG. 1) including solid-state drives (SSDs). One or more processing units are allocated to implement data processing in the memory system. When time-series data are collected by a smart device 280 (FIG. 2) and provided to the memory system for storage in the SSDs, the one or more processing units are configured to compress the time-series data using the method 900 for the memory system.

It should be understood that the particular order in which the operations in FIG. 11 have been described are merely exemplary and are not intended to indicate that the described order is the only order in which the operations could be performed. One of ordinary skill in the art would recognize various ways to enhance speech quality. Additionally, it should be noted that details of other processes described above with respect to FIGS. 6-8C are also applicable in an analogous manner to method 900 described above with respect to FIG. 9. For brevity, these details are not repeated here.

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method for compressing data, comprising: at a computer system having one or more processors and memory: obtaining, from an electronic device, a plurality of time-series data sets, each of which includes a temporally indexed sequence of data items; identifying a first data pattern that is shared by the plurality of time-series data sets, the first data pattern including a first subset of successive data items; representing the first data pattern with a first pattern indicator; applying the first pattern indicator in place of the first subset of successive data items corresponding to the first data pattern in each of the plurality of time-series data sets; and storing the first data pattern and the plurality of time-series data sets each of which includes the first pattern indicator.

Clause 2. The method of clause 1, further comprising: obtaining a new time-series data set; determining that the new time-series data set includes a portion that corresponds to the first data pattern; and replacing the portion of the new time-series data set corresponding to the first data pattern with the first pattern indicator.

Clause 3. The method of clause 1 or 2, wherein the first subset of successive data items corresponding to the first data pattern has a respective temporal location in each of the plurality of time-series data sets, and respective temporal locations of the first data pattern in the plurality of time-series data sets are aligned with one another.

Clause 4. The method of any of clauses 1-3, further comprising: identifying a second data pattern that is shared by a subset of two or more time-series data sets of the plurality of time-series data sets, the second data pattern distinct from the first data pattern and including a second subset of successive data items, the subset of two or more time-series data sets including less than all of the plurality of time-series data sets.

Clause 5. The method of clause 4, further comprising: applying a second pattern indicator in place of the second subset of successive data items corresponding to the second data pattern in each of the subset of two or more time-series data sets, wherein each of the second subset of successive time-series data sets is stored with the second pattern indicator in place of the second data pattern.

Clause 6. The method of any of clauses 1-5, wherein the plurality of time-series data sets includes a first time-series data set including the first subset of successive data items and a remainder set of data items, the method further comprising: representing the remainder set of data items with one or more pattern indicators, wherein the one or more pattern indicators include a third pattern indicator, and the third pattern indicator corresponds to a third subset of one or more successive data items that appears at a corresponding temporal location within the first time-series data set.

Clause 7. The method of clause 6, further comprising: adding the third subset of one or more successive data items corresponding to the third data pattern into a corpus of training data items to be used by a machine learning system to generate an anomaly detection model for detecting anomalies in a physical process detected by the electronic device.

Clause 8. The method of clause 6, further comprising: modifying at least one data item in the third subset of one or more successive data items, corresponding to the third data pattern, to generate synthetic training data having a modified subset of one or more successive data items; and adding the synthetic training data into a corpus of training data items to be used by a machine learning system to generate an anomaly detection model for detecting anomalies in a physical process detected by the electronic device.

Clause 9. The method of any of clauses 1-8, wherein each of the first subset of successive data items of the first data pattern has a respective data value, the method further comprising, for each of the plurality of time-series data sets: determining that the respective time-series data set includes a respective set of successive data items, each data item of which is equal to the respective data value of a corresponding data item of the first subset of successive data items of the first data pattern.

Clause 10. The method of any of clauses 1-8, wherein each of the first subset of successive data items of the first data pattern has a respective value tolerance range, and the method further comprises, for each of the plurality of time-series data sets: determining that the respective time-series data set includes a respective set of successive data items, each data item of which is within the respective value tolerance range of a corresponding data item of the first subset of successive data items of the first data pattern.

Clause 11. The method of any of clauses 1-8, wherein each of the first subset of successive data items of the first data pattern has a respective data change rate, further comprising, for each of the plurality of time-series data sets: determining that the respective time-series data set includes a set of successive data items, each data item of which is equal to, or within a respective change tolerance range of, the respective data change rate of a corresponding data item of the first subset of successive data items of the first data pattern.

Clause 12. The method of any of clauses 1-11, wherein storing the first data pattern further comprises: quantizing each data item of the first subset of successive data items of the first data pattern to generate a quantized first data pattern; and storing the quantized first data pattern.

Clause 13. The method of any of clauses 1-12, wherein the electronic device is part of a machine, and obtaining the plurality of time-series data sets further comprises: obtaining each of the plurality of time-series data sets from the electronic device, while the machine is implementing a respective robotic operation according to a predefined operation configuration.

Clause 14. The method of clause 13, further comprising: applying a pattern analysis model to process the first data pattern and generate a pattern control output; and adjusting the predefined operation configuration of the machine based on the pattern control output.

Clause 15. The method of any of clauses 1-14, further comprising: modifying at least one data item in the first subset of one or more successive data items, corresponding to the first pattern indicator, to generate a modified first subset of one or more successive data items; and adding the modified first subset of one or more successive data items into a corpus of training data items.

Clause 16. The method of any of clauses 1-15, wherein identifying the first data pattern that is shared by the plurality of time-series data sets further comprises: applying dynamic time warping to identify the first data pattern at a first temporal location in a first time-series data set and at a second temporal location in a second time-series data set, respectively, wherein the second temporal location is distinct from the first temporal location.

Clause 17. The method of any of clauses 1-15, wherein identifying the first data pattern that is shared by the plurality of time-series data sets further comprises: determining that the first data pattern corresponding to a first data segment in a first time-series data set, wherein a first length of the first data segment is equal to a length of the first data pattern; and determining that the first data pattern corresponding to a second data segment in a second time-series data set, including stretching a length of the second data segment to match the length of the first data pattern and adding one or more data items to supplement the second data segment of the second time-series data set to match the first data pattern.

Clause 18. The method of any of clauses 1-15, wherein identifying the first data pattern that is shared by the plurality of time-series data sets further comprises: determining that the first data pattern corresponding to a first data segment in a first time-series data set, wherein a first length of the first data segment is equal to a length of the first data pattern; and determining that the first data pattern corresponding to a second data segment in a second time-series data set, including scaling down a length of the second data segment to match the length of the first data pattern and removing one or more data items to match the second time-series data set to the first data pattern.

Clause 19. A non-transitory computer readable storage medium, storing one or more programs for execution by one or more processors of a computer system, the one or more programs including instructions for implementing a method in any of clauses 1-18.

Clause 20. A computer system, comprising: one or more processors; and memory for storing one or more programs for execution by the one or more processors, the one or more programs including instructions for implementing a method in any of clauses 1-18.

In some embodiments, any of the above clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is also to be appreciated that while the terms user may be used to refer to the person or persons acting in the context of some particularly situations described herein, these references do not limit the scope of the present teachings with respect to the person or persons who are performing such actions. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for compressing data, comprising:
at a computer system having one or more processors and memory:
obtaining a plurality of time-series data sets, each of which includes a temporally indexed sequence of data items;
identifying a first data pattern that is shared by the plurality of time-series data sets, the first data pattern including a first subset of successive data items;
representing the first data pattern with a first pattern indicator;
replacing the first subset of successive data items corresponding to the first data pattern with the first pattern indicator in each of the plurality of time-series data sets;
applying a pattern analysis model to process the first data pattern that is shared by the plurality of time-series data sets and generate a pattern control output;
modifying an operation of a machine, external to and distinct from the computer system, based on the control pattern output, wherein the operation of the machine includes a programmable control arm; and
storing the first data pattern and the plurality of time-series data sets in a database, each of the plurality of time-series data sets including the first pattern indicator.

2. The method of claim 1, further comprising:
obtaining a new time-series data set;
determining that the new time-series data set includes a portion that corresponds to the first data pattern; and
replacing the portion of the new time-series data set corresponding to the first data pattern with the first pattern indicator.

3. The method of claim 1, wherein the first subset of successive data items corresponding to the first data pattern has a respective temporal location in each of the plurality of time-series data sets, and respective temporal locations of the first data pattern in the plurality of time-series data sets are aligned with one another.

4. The method of claim 1, further comprising:
identifying a second data pattern that is shared by a subset of two or more time-series data sets of the plurality of time-series data sets, the second data pattern distinct from the first data pattern and including a second subset of successive data items, the subset of two or more time-series data sets including less than all of the plurality of time-series data sets.

5. The method of claim 4, further comprising:
applying a second pattern indicator in place of the second subset of successive data items corresponding to the second data pattern in each of the subset of two or more time-series data sets, wherein each of the second subset of successive time-series data sets is stored with the second pattern indicator in place of the second data pattern.

6. The method of claim 1, wherein the plurality of time-series data sets includes a first time-series data set including the first subset of successive data items and a remainder set of data items, the method further comprising:
representing the remainder set of data items with one or more pattern indicators, wherein the one or more pattern indicators include a third pattern indicator, and the third pattern indicator corresponds to a third subset of one or more successive data items that appears at a corresponding temporal location within the first time-series data set.

7. The method of claim 6, further comprising:
adding the third subset of one or more successive data items, corresponding to a third data pattern, into a corpus of training data items to be used by a machine learning system to generate an anomaly detection model for detecting anomalies in a physical process performed by the machine.

8. The method of claim 6, further comprising:
modifying at least one data item in the third subset of one or more successive data items, corresponding to a third data pattern, to generate synthetic training data having a modified subset of one or more successive data items; and
adding the synthetic training data into a corpus of training data items to be used by a machine learning system to generate an anomaly detection model for detecting anomalies in a physical process performed by the machine.

9. The method of claim 1, wherein each of the first subset of successive data items of the first data pattern has a respective data value, the method further comprising, for each of the plurality of time-series data sets:
determining that the respective time-series data set includes a respective set of successive data items, each data item of which is equal to the respective data value of a corresponding data item of the first subset of successive data items of the first data pattern.

10. The method of claim 1, wherein each of the first subset of successive data items of the first data pattern has a respective value tolerance range, and the method further comprises, for each of the plurality of time-series data sets:
determining that the respective time-series data set includes a respective set of successive data items, each data item of which is within the respective value tolerance range of a corresponding data item of the first subset of successive data items of the first data pattern.

11. The method of claim 1, wherein each of the first subset of successive data items of the first data pattern has a respective data change rate, further comprising, for each of the plurality of time-series data sets:
determining that the respective time-series data set includes a set of successive data items, each data item of which is equal to, or within a respective change tolerance range of, the respective data change rate of a corresponding data item of the first subset of successive data items of the first data pattern.

12. The method of claim 1, wherein storing the first data pattern further comprises:
quantizing each data item of the first subset of successive data items of the first data pattern to generate a quantized first data pattern; and
storing the quantized first data pattern.

13. A computer system, comprising:
one or more processors; and
memory storing one or more programs for execution by the one or more processors, the one or more programs further comprising instructions for:
obtaining a plurality of time-series data sets, each of which includes a temporally indexed sequence of data items;

identifying a first data pattern that is shared by the plurality of time-series data sets, the first data pattern including a first subset of successive data items;

representing the first data pattern with a first pattern indicator;

replacing the first subset of successive data items corresponding to the first data pattern with the first pattern indicator in each of the plurality of time-series data sets;

applying a pattern analysis model to process the first data pattern that is shared by the plurality of time-series data sets and generate a pattern control output;

modifying an operation of a machine, external to and distinct from the computer system, based on the control pattern output, wherein the operation of the machine includes a programmable control arm; and storing the first data pattern and the plurality of time-series data sets in a database, each of the plurality of time-series data sets including the first pattern indicator.

14. The computer system of claim 13, wherein:

the plurality of time-series data sets are obtained from an electronic device that is part of the machine; and obtaining the plurality of time-series data sets further comprises obtaining each of the plurality of time-series data sets from the electronic device while the machine is implementing a respective robotic operation according to a predefined operation configuration;

wherein modifying the operation of the machine includes adjusting the predefined operation configuration of the machine based on the pattern control output.

15. The computer system of claim 13, the one or more programs further comprising instructions for:

modifying at least one data item in the first subset of one or more successive data items, corresponding to the first pattern indicator, to generate a modified first subset of one or more successive data items; and adding the modified first subset of one or more successive data items into a corpus of training data items.

16. The computer system of claim 13, the one or more programs further comprising instructions for:

obtaining a new time-series data set;

determining that the new time-series data set includes a portion that corresponds to the first data pattern; and replacing the portion of the new time-series data set corresponding to the first data pattern with the first pattern indicator.

17. A non-transitory computer-readable storage medium, storing one or more programs for execution by one or more processors, the one or more programs further comprising instructions for:

obtaining a plurality of time-series data sets, each of which includes a temporally indexed sequence of data items;

identifying a first data pattern that is shared by the plurality of time-series data sets, the first data pattern including a first subset of successive data items;

representing the first data pattern with a first pattern indicator;

replacing the first subset of successive data items corresponding to the first data pattern with the first pattern indicator in each of the plurality of time-series data sets;

applying a pattern analysis model to process the first data pattern that is shared by the plurality of time-series data sets and generate a pattern control output;

modifying an operation of a machine based on the control pattern output, wherein the operation of the machine includes a programmable control arm; and storing the first data pattern and the plurality of time-series data sets in a database, each of the plurality of time-series data sets including the first pattern indicator.

18. The non-transitory computer-readable storage medium of claim 17, wherein identifying the first data pattern that is shared by the plurality of time-series data sets further comprises:

applying dynamic time warping to identify the first data pattern at a first temporal location in a first time-series data set and at a second temporal location in a second time-series data set, respectively, wherein the second temporal location is distinct from the first temporal location.

19. The non-transitory computer-readable storage medium of claim 17, wherein identifying the first data pattern that is shared by the plurality of time-series data sets further comprises:

determining that the first data pattern corresponding to a first data segment in a first time-series data set, wherein a first length of the first data segment is equal to a length of the first data pattern; and determining that the first data pattern corresponding to a second data segment in a second time-series data set, including stretching a length of the second data segment to match the length of the first data pattern and adding one or more data items to supplement the second data segment of the second time-series data set to match the first data pattern.

20. The non-transitory computer-readable storage medium of claim 17, wherein identifying the first data pattern that is shared by the plurality of time-series data sets further comprises:

determining that the first data pattern corresponding to a first data segment in a first time-series data set, wherein a first length of the first data segment is equal to a length of the first data pattern; and determining that the first data pattern corresponding to a second data segment in a second time-series data set, including scaling down a length of the second data segment to match the length of the first data pattern and removing one or more data items to match the second data segment of the second time-series data set to the first data pattern.

* * * * *